US006995816B2

(12) United States Patent
Mi et al.

(10) Patent No.: US 6,995,816 B2
(45) Date of Patent: Feb. 7, 2006

(54) OPTICAL DEVICES COMPRISING HIGH PERFORMANCE POLARIZER PACKAGE

(75) Inventors: Xiang-Dong Mi, Rochester, NY (US); David Kessler, Rochester, NY (US); Andrew F. Kurtz, Rochester, NY (US); Tomohiro Ishikawa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/121,991

(22) Filed: Apr. 12, 2002

(65) Prior Publication Data
US 2003/0193635 A1 Oct. 16, 2003

(51) Int. Cl.
*G02F 1/1335* (2006.01)
(52) U.S. Cl. .................. 349/96; 349/117; 349/118; 349/119; 349/120; 349/102
(58) Field of Classification Search ............... 349/96, 349/117, 118, 119, 120, 102
See application file for complete search history.

(56) References Cited

U.S. PATENT DOCUMENTS 5,895,106 A * 4/1999 VanderPloeg et al. ...... 349/120
6,266,114 B1 * 7/2001 Skarohlid .................... 349/119

FOREIGN PATENT DOCUMENTS

| EP | 1 087 254 | 3/2001 |
| JP | 10142423 | 5/1998 |
| JP | 2001-350022 | 12/2001 |

OTHER PUBLICATIONS

J. Chen, et al, "Optimum Film Compensation Modes for TN and VA LCDs", SID 98 Digest, (1998), pp. 315-318.

Ishinabe, et al, "Novel Wide Viewing Angle Polarizer with High Achromaticity", SID 2000 Digest, (2000), pp. 1094-1097.
Ishinabe, et al, "LP-6: Design of a Quarter Wave Plate with Wide Viewing Angle and Wide Wavelength Range for High Quality Reflective LCDs", SID 01 Digest, (2001), pp. 906-909.
Lazarev et al, "Low-leakage off-angle in E-polarizers", Journal of the SID (2000), pp. 101-105.
T. Ishinabe, et al, "A Wide Viewing Angle Polarizer and a Quarter-wave plate with a Wide Wavelength Range for Extremely High Quality LCDs", Asia Display/IDW 2001, pp. 485-488.
A. Uchiyama, et al, "Recent Progress in Optical Retardation Films for FPDs", Asia Display/IDW '01, pp. 493-496.
Pochi Yeh et al., "Birefringent Optical Compensators for TN-LCDS", vol. 3421, Jul. 1998, pp. 224-235.
T. Ishinabe, et al., "A Wide Viewing Angle Polarizer and a Quarter-wave Plate with a Wide Wavelength Range for Extremely High Quality LCDS", Asia Display/IDW, 2001, pp. 485-488.

* cited by examiner

Primary Examiner—Robert H. Kim
Assistant Examiner—George Y. Wang
(74) Attorney, Agent, or Firm—Arthur E. Kluegel

(57) ABSTRACT

Disclosed is a polarizer package comprising an integrated combination of an absorbing layer and a compensator. Two of the identical polarizer packages can be crossed and used in a transmissive optical device. This polarizer package can also be used in combination with a reflective plate and a quarter wave plate in a reflective optical device. Such polarizer packages exhibit an improved viewing angle characteristic across all wavelengths of interest, has a large tolerance for compensators to be aligned relative to their preferred directions, and can be used within an LCD or emissive display system.

6 Claims, 16 Drawing Sheets

OPTICAL DEVICES COMPRISING HIGH PERFORMANCE POLARIZER PACKAGE

FIELD OF THE INVENTION

The present invention relates to optical devices comprising sheet polarizer packages comprising certain arrangements of compensator plates.

BACKGROUND OF THE INVENTION

Flat Panel Displays such as Liquid Crystal Displays typically use sheet polarizers. Most of the sheet polarizers in a commercial scale production are made by a unidirectional alignment of dichroic crystals in a sub-micron size. The crystals are introduced into a polymer material such as Polyvinyl Alcohol (PVA) followed by stretching to introduce an uni-axial alignment of the dichroic crystals. An "O"-type sheet polarizer absorbs the extraordinary ray vibrating in the direction of the stretch while transmitting the ordinary ray. The other type of sheet polarizer, "E", transmits the extraordinary ray and absorbs the ordinary ray. Most of the sheet polarizers currently in a commercial use are "O" type. Note that there are many other types of polarizers, such as wire grid polarizers described in U.S. Pat. No. 6,122,103 commercially available from Moxtek Inc. of Orem, Utah, or prismatic polarizers as disclosed in U.S. Pat. No. 2,403,731, however, in this patent application, "polarizer" shall be understood as sheet polarizers only, such as high efficiency polarizer NPF-G1220DU available from Nitto Denko America, Inc. of San Jose, Calif. An ideal sheet polarizer would absorb 100% of light polarized in the absorbing axis and transmit 100% of light polarized in the transmission axis. However, a practical sheet polarizer generally transmits less than 50% of incoming un-polarized light. Usually, a sheet polarizer comprises an absorbing layer and two protective layers, and sometimes also includes compensators. For this reason, a polarizer will also be referred to as a polarizer package in this application.

In a typical transmissive LCD such as Twisted Nematic (TN) LCD, a liquid crystal cell is positioned between two crossed polarizer packages with their absorbing axes (or equally, transmission axes) orthogonal to each other. With continuous development of LCDs modes and their compensators, the apparent quality of LCDs can be limited by the performance of the polarizer package. N particular, the apparent performance of an LCD is much affected by the amount of light leakage traveling through the two crossed polarizer packages when the liquid crystal is not placed between the two crossed polarizers. It is desirable to have as little light leakage as possible. Actually, very little light can go through two crossed polarizer packages provided the light is impinged in the direction normal to the plane of the sheet polarizers. As is well known in the art, however, when the light propagation direction deviates from the normal, there occurs a significant amount of light leakage with the maximum leakage occurring at a large polar angle and 45 degrees of azimuthal angle relative to the transmission axis of the polarizer. In order to prevent this, the combination of two types of polarizers "O" type and "E" type has been suggested by Lazarev et al. ("Low-leakage off-angle in E-polarizers", Journal of the SID, pp. 101–105 (2001)). Theoretically, a matched combination of the two transmits little light in all directions. Yet, actual materialization of the "E"-type sheet polarizer is in its beginning state and its performance, by no means, is satisfactory. Thus, other methods of prevention of the leakage are desirable for practical applications. In what follows, a polarizer may be either an "O" or "E" type, although the specific examples provided actually are "O" type sheet polarizers.

Another approach to reduce light leakage through two crossed polarizer packages is to insert a compensator between the two polarizer packages. The compensators used for polarizers are nominally a combination of an A-plate and a C-plate, or two biaxial plates, as suggested by Chen et al. ("Optimum film compensation modes for TN and VA LCDs", SID 98 Digest, pp. 315–318 (1998)) and Ishinabe et al. ("Novel wide viewing angle polarizer with high achromaticity", SID 2000 Digest, pp. 1094–1097 (2000); and "A wide viewing angle polarizer and a quarter-wave plate with a wide wavelength range for extremely high quality LCDs", Asia Display/IDW 2001, pp. 485–488 (2001)), respectively. Thus a wide viewing angle polarizer is realized. A wide viewing angle polarizer shall be understood as a polarizer package comprising an integrated combination of an absorbing layer (which polarizes light) and its compensators, which enables a transmissive optical device comprising two crossed polarizer packages with little light leakage from wide viewing angles. As discussed above, this transmissive optical device formed by two crossed polarizer packages is critical to the quality of an LCD.

By a careful examination of the designs of the transmissive optical device formed by wide viewing angle polarizers in the prior art, the inventors have found that in most cases, the prior art designs for the crossed polarizer packages cannot be separated into two identical parts containing the first polarizer package and the second crossed polarizer package. This is explained in FIG. 2D. A prior art transmissive optical device 29 is formed by two crossed polarizer packages 29A and 29B. The polarizer package 29A is constructed by an integrated combination of an absorbing layer 25A and a compensator 23A, while the polarizer package 29B is constructed by an integrated combination of an absorbing layer 25B and a compensator 23B. The arrows in the plane of absorbing layers 25A, 25B indicate their transmission axes and are orthogonal to each other. The compensators 23A and 23B are intended to prevent light 7 from leaking through the optical device 29, however, according to the prior art, the compensators 23A, 23B are different. Consequently, the resulting polarizer packages 29A, 29B, which are integrated combinations of an absorbing layer and a compensator, are not identical. This characteristic means that the package of the first polarizer is different from that of the second polarizer due to the use of two different compensators, and this optical device 29 will be referred as a non-identical compensators design device in this application.

As a result of this non-identical compensators design, the prior art requires a strict alignment for the compensator relative to the transmission axis of the absorbing layer, and therefore complex and precise manufacturing processes are employed. Such designs also require manufacturing two different compensators, and therefore an extra procedure in a production. Furthermore, a polarizer package design using non-identical compensators, such as suggested by Chen et al., can be used with a transmissive optical device, but not with a reflective optical device. Alternately, according to Ishinabe et al. ("A wide viewing angle polarizer and a quarter-wave plate with a wide wavelength range for extremely high quality LCDs", Asia Display/IDW 2001, pp. 485–488 (2001)), two different biaxial plates can be used effectively as compensators in a polarizer package for the front and the rear polarizers, respectively. Although two identical biaxial plates can be utilized in conjunction with the front and rear polarizers, the performance of crossed polarizer packages degrades, as the referenced publication states.

Yoshimi et al. disclosed a polarizer with an attached compensator in Japanese Patent 09325216A. The compensator can be put on at least one side of the absorbing layer. The film is of biaxial nature with an in-plane retardation 50 to 200 nm. The in-plane slow axis lies either parallel or perpendicular to the transmission axis of the polarizer. However, the principal function of the compensator in their invention is not to compensate the crossed polarizers, but rather to compensate for the light in an oblique direction through the liquid crystal cell so as to prevent color shift and contrast inversion. Therefore, the transmissive optical device formed by two such crossed polarizer packages alone may not prevent light leakage at a wide viewing angle.

Therefore it is desirable to provide enhanced polarizer packages which have reduced sensitivity to an alignment of its compensator relative to its transmission axis, and which can therefore be fabricated with a simpler and less demanding method.

It is also desirable to provide a polarizer package, which provides enhanced polarization performances by using substantially identical polarizer packages for both the front and rear polarizers to form a transmissive optical device. "Substantially the same polarizer package" means a polarizer package manufactured by the same method.

Furthermore, it is desirable to provide a polarizer package, which provides enhanced polarization performances not only effective in a transmissive optical device, but also in a reflective optical device comprising such a polarizer package, a quarter wave plate, and a reflective layer.

These high performance polarizer packages can be employed to improve viewing characteristics of a liquid crystal display. Also applications can be made, in combination with a wide viewing quarter wave plate, as an anti-reflection films for an emissive display, such as an Organic Light Emitting Diode display (OLED).

SUMMARY OF THE INVENTION

The invention provides optical devices comprising (1) a pair of substantially identical crossed sheet polarizer packages, each sheet polarizer package comprising an integrated combination of an absorbing layer and a compensator placed on at least one side of said absorbing layer, wherein the compensator comprises either two A-plates, or an A-plate and a C-plate, or a particular biaxial plate or (2) a polarizer package, a quarter-wave plate, and a reflective layer, wherein the polarizer package comprises an integrated combination of an absorbing layer and compensator, wherein the compensator comprises an A-plate or a C-plate.

The device shows reduced light leakage at all viewing angles and across a broad wavelength range. The device also has a large tolerance for the compensators to be aligned relative to their preferred directions.

BRIEF DESCRIPTION OF THE DRAWINGS

FIG. 4A is a "substantially identical" inventive embodiment and 4B is a non-identical comparison.

DETAILED DESCRIPTION OF THE INVENTION

It is one of our objects to provide a high performance polarizer package, which has a large tolerance of alignment of the compensators relative to their preferred orientation, and therefore can be fabricated with a simpler process.

It is another of our objects to provide a high performance polarizer package, which can be used in conjunction with another identical polarizer package.

It is yet another of our objects to provide a high performance polarizer package which can be used in conjunction with a reflective plate and a quarter-wave plate.

It is yet another of our objects to provide a high performance polarizer package, which can be used in combination with an LCD to achieve high quality.

It is yet another of our objects to provide a high performance polarizer package, which can be used in combination with an emissive display such as an organic light emitting diode display (OLED).

Reference will now be made to the drawings in which the various elements of the present invention will be given numerical designations and in which the invention will be discussed so as to enable one skilled in the art to make and use the invention.

Figure 1A:
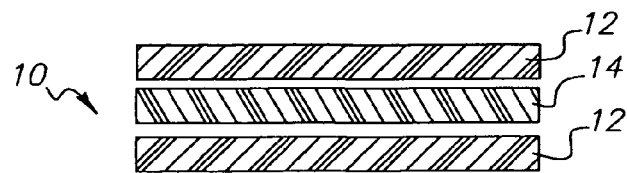
FIG. 1A is a cross sectional view of a prior art polarizer package.

FIG. 1A illustrates a basic prior art polarizer package 10, which consists of an absorbing layer 14 (typically a PVA layer) sandwiched between two protective layers 12 (typically Triacetate cellulose layers). Although the protective layers 12 may be manufactured with unintended or random retardation either in its plane (around 1~10 nm) or across its thickness direction (around −40~−80 nm), its retardation is not meant to compensate the viewing angle characteristic of the polarizer package 10. Actually, the absolute retardation values of the protective layers 12 are preferred to be as small as possible.

Figure 1B:
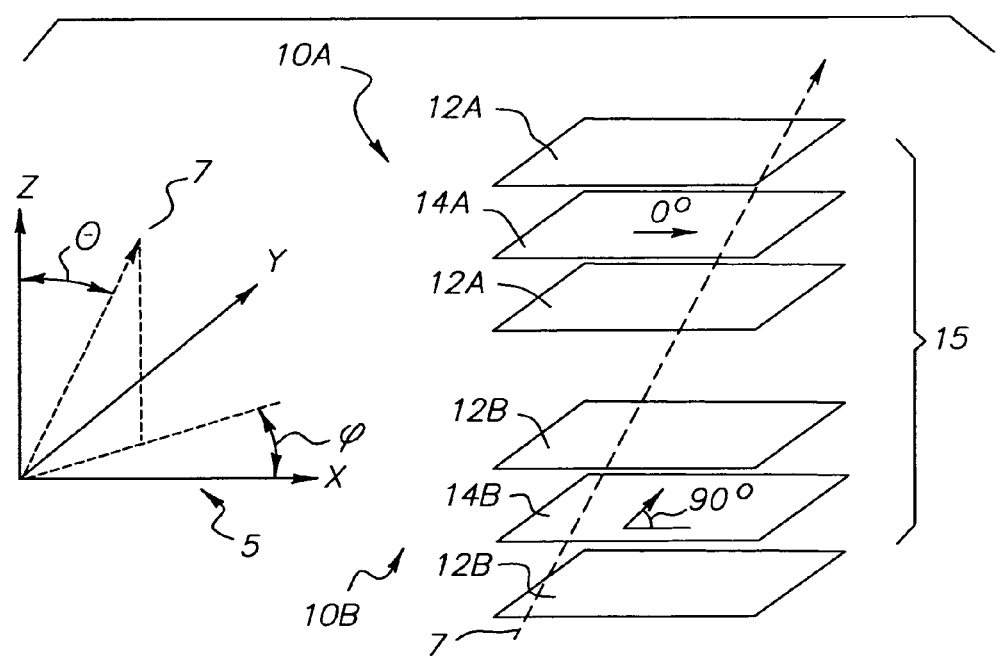
FIG. 1B is a perspective view of a transmissive optical device formed by a pair of crossed prior art polarizer packages.

FIG. 1B illustrates a transmissive optical device 15 formed by two crossed prior art polarizer packages 10A, 10B according to the polarizer package 10, comprising the absorbing layers 14A, 14B and the protective layers 12A, 12B. The two polarizer packages 10A, 10B are said to be crossed (or orthogonal) because their absorbing layers 14A, 14B are arranged crossed; more specifically, one absorbing layer such as 14A is arranged at an azimuthal angle of 0 degree and the other one such as 14B is at 90 degrees. The azimuthal angle $\phi$ is measured from the x-axis and in the xy plane of an xyz coordinate system 5, in which the z-axis is perpendicular to the plane of absorbing layers 14A, 14B. The xyz coordinate system 5 also defines a polar angle $\theta$ measured from the z-axis. The arrow in the plane of absorbing layer 14A or 14B indicates its transmission axis, which is perpendicular to its absorption axis. In the following figures, an arrow in the plane of an absorbing layer such as 25A, 25B, 31A, 31B, 54, or 70 always points to its transmission axis. It should be mentioned that the transmission (or absorption) axis of the polarizer package 10A (or 10B) is the same as the transmission (or absorption) axis of the absorbing layer 14A (or 14B) when light travels along the z-axis. Therefore in this application, the transmission (or absorption) axis of the polarizer package is understood as the transmission (or absorption) axis of its absorbing layer. FIG. 1B also shows a beam of light 7 striking the optical device 15 and specified by a polar angle $\theta$ and an azimuthal angle $\phi$. When the light 7 is impinged in the direction normal to the plane of sheet polarizer packages, i.e., the polar angle $\theta$=0 degree, little light passes through the device 15. However, a significant amount of light 7 leaks through the optical device 15 when it travels at a large polar angle $\theta$ (60 degrees, for example) and an azimuthal angle $\phi$ of about 45 degrees. Note that in this example, the transmission axes of the absorbing layers 14A and 14B are arranged at azimuthal angles of 0 degree and 90 degrees, respectively.

Figure 1C:
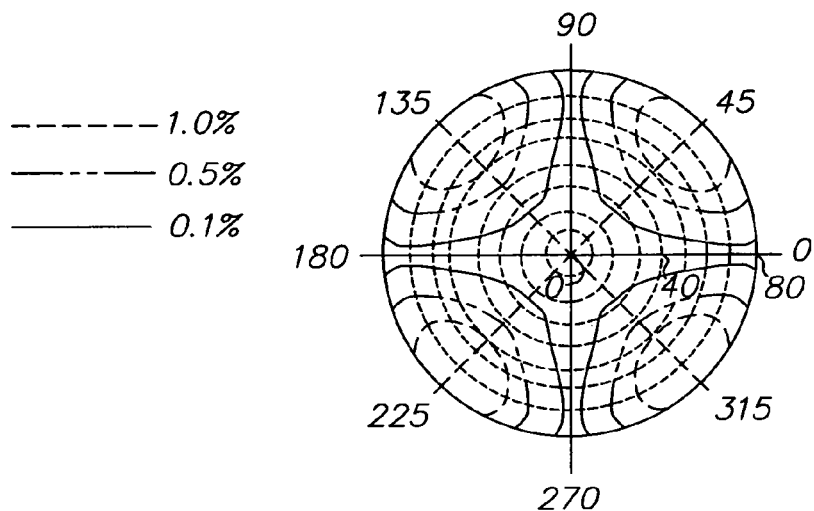
FIG. 1C is an iso-transmission plot of crossed prior art polarizer packages.
Figure 1D:
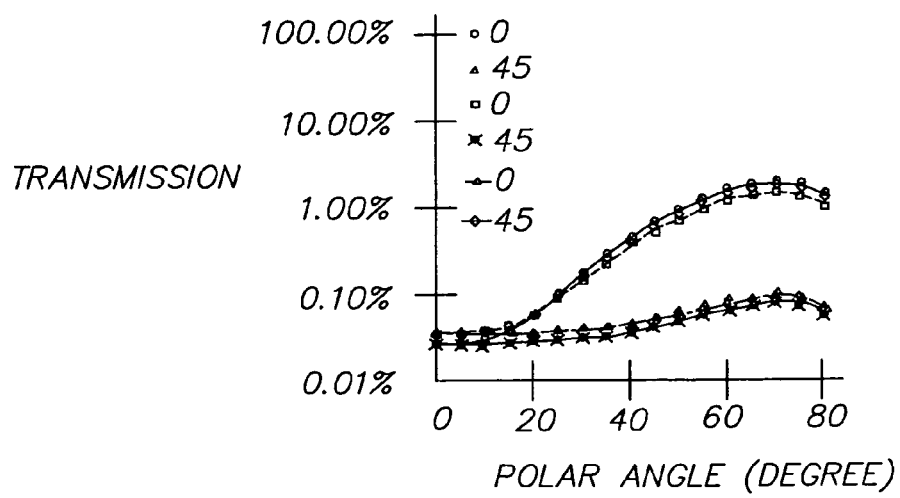
FIG. 1D is a plot of transmission vs polar angle through crossed prior art polarizer packages.

FIG. 1C shows the viewing angle characteristic of a prior art transmissive optical device 15 comprising two crossed polarizer packages 10A, 10B. The concentric circles correspond to different polar angles $\theta$, while the lines (at 0, 45, 90, 135, 180, 225, 270, 315 degrees) indicate azimuthal angles $\phi$. The transmission axes of the two polarizer packages are located on the vertical (the line 90–270 degree) and the horizontal (the line 0–180 degree) directions. The iso-transmission curves designated as 0.1%, 0.5%, and 1.0% correspond to the transmission of 0.1%, 0.5%, and 1.0%, respectively, through the prior art optical device 15. It can be seen that on any concentric circle (for example, the circle of 60 degrees), the amount of light leakage in the diagonal direction (the line 45–225 degree and the line 135–315 degree) is much larger than in the horizontal (the line 0–180 degree) or vertical (the line 90–270 degree) direction. FIG. 1D shows the variation in the transmission with a change in the polar angle $\theta$ at azimuthal angles 0 (filled symbols) and 45 (empty symbols) degrees for three different wavelengths, 450 (squares), 550 (triangles), and 650 nm (circles). The transmission at a given polar angle is approximately independent of the three wavelengths. Both FIGS. 1C and 1D illustrate that, at a polar angle of 60 degrees and an azimuthal angle of 45 degrees, about 1.2% to 1.4% of light leaks through the crossed polarizer packages (although this leakage depends on the thickness and refractive indices of polarizer, the compensation principles disclosed in this invention apply to all other circumstances). The criterion used for compensators is to reduce the light leakage below 0.1% (reduced by a factor of more than 10 compared to 1.4%, the case without compensators) for all azimuthal angles, and possibly for all wavelengths of interest, when viewed from a polar angle of 60 degrees or lower. In this application, all data provided in exemplary polarizers used with prior art examples and invention examples such as in FIGS. 1C, 1D, 2C, 8A, 8B, 8C, 9A, and 9B refer to a polarizer similar to a Nitto Denko's NPF-G1220DU high efficiency polarizer. However, the invention applies to all other sheet polarizers.

Figure 3A:
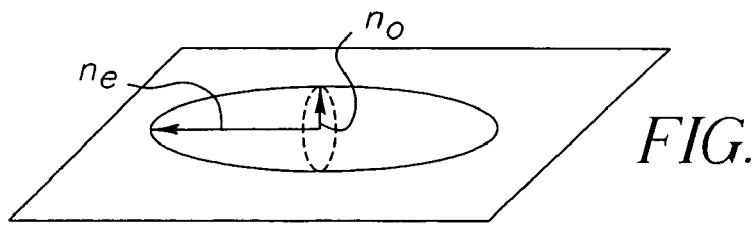
FIGS. 3A through 3D are various kinds of compensators.
Figure 3B:
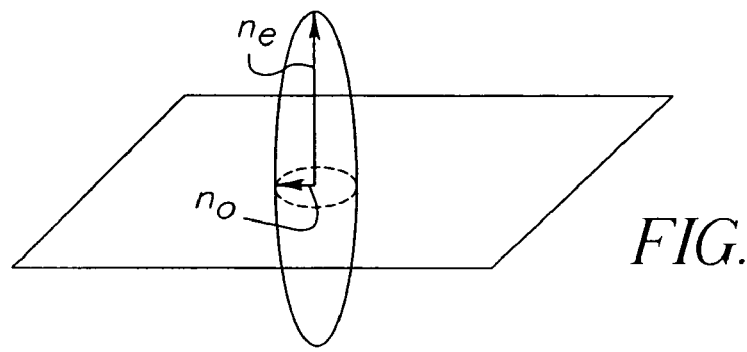
Figure 3C:
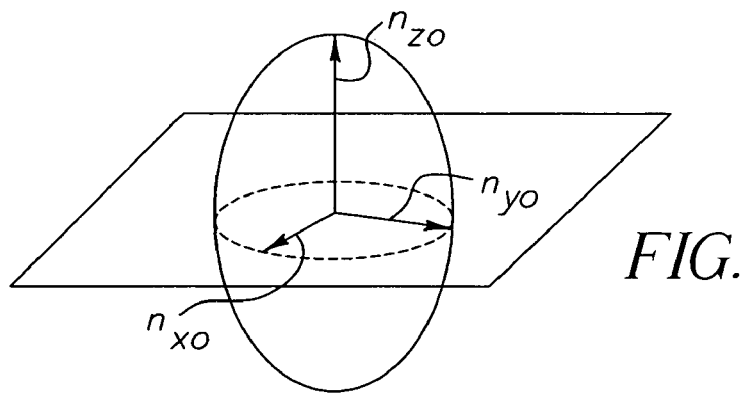
Figure 3D:
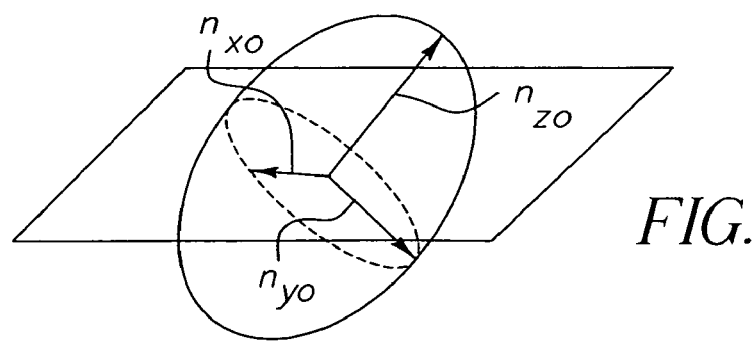

The transmission through an optical device formed by a pair of crossed polarizer packages has been significantly reduced for all viewing angles by insertion of proper compensators such as A-plates, C-plates, or biaxial plates. As is well known for those skilled in the art, what are referred as an A-plate, a C-plate and a biaxial plate are defined as follows referring to FIGS. 3A through 3D. An A-plate and a C-plate are made of optically uniaxial materials, which are characterized by two indices of refraction, $n_e$ (the extraordinary refractive index) and $n_o$ (the ordinary refractive index). The optic axis, the direction along which light does not see birefringence, lies in the direction of $n_e$. If the optic axis lies in the plane of the plate, it is an A-plate as shown in FIG. 3A, while it is a C-plate if the optic axis is in the normal direction as shown in FIG. 3B. Biaxial plates, as shown in FIG. 3C, on the other hand, have three different principal indices of refraction, $n_{x0}$, $n_{y0}$ and $n_{z0}$. In this case, the optic axis does not necessarily lie on the direction of the maximum (or minimum) index of refraction. In general, the three principal axes of refractive index do not lie in the plane of the plate, as shown in FIG. 3D. In the examples provided below according to the current invention, all biaxial plates refer to ones as in FIG. 3C with axes of $n_{x0}$ and $n_{y0}$ in the plane of the plate and the axis of $n_{z0}$ perpendicular to the plane of the plate.

Figure 2A:
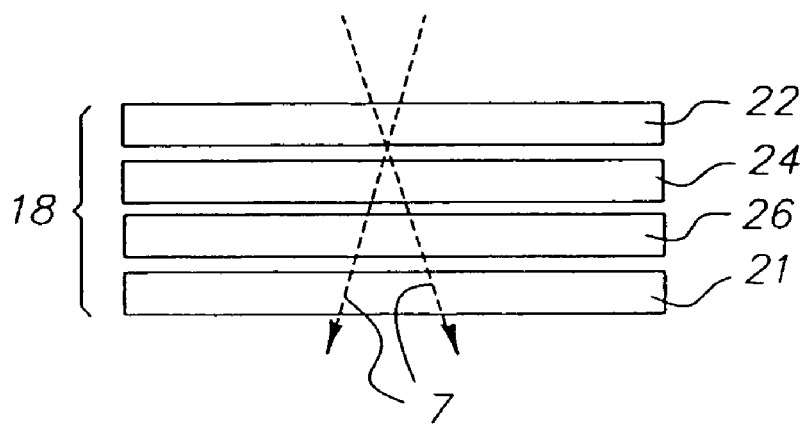
FIGS. 2A and 2B are cross sectional views of prior art polarizers with compensators.
Figure 2B:
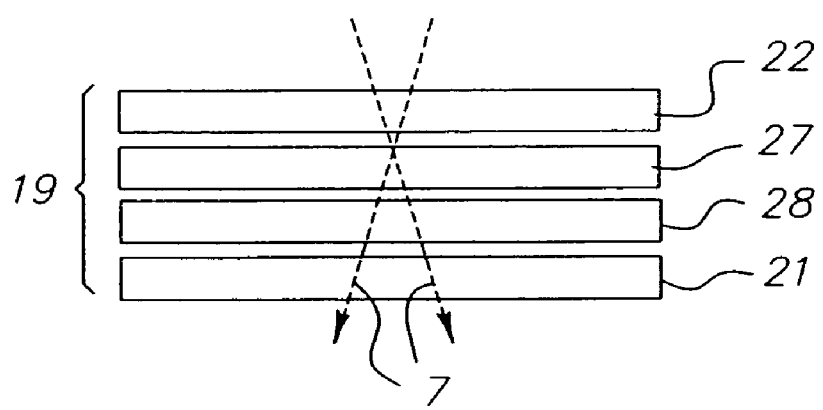
Figure 2C:
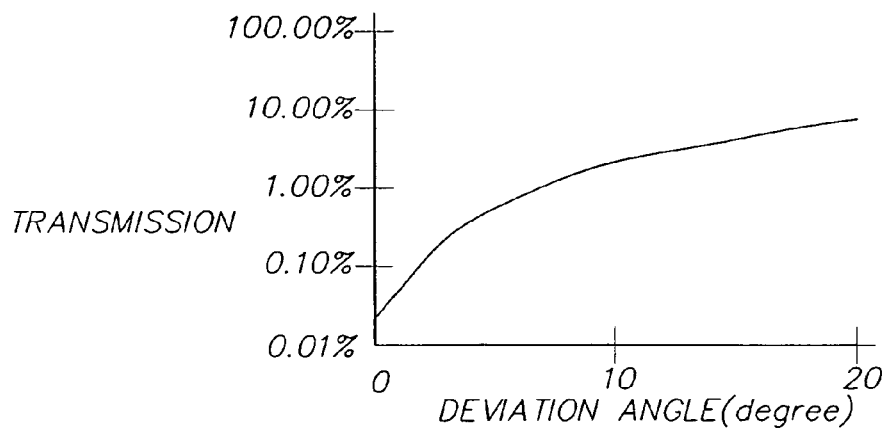
FIG. 2C is an angular performance of a transmissive optical device formed by one of the prior art wide viewing polarizer packages.
Figure 2D:
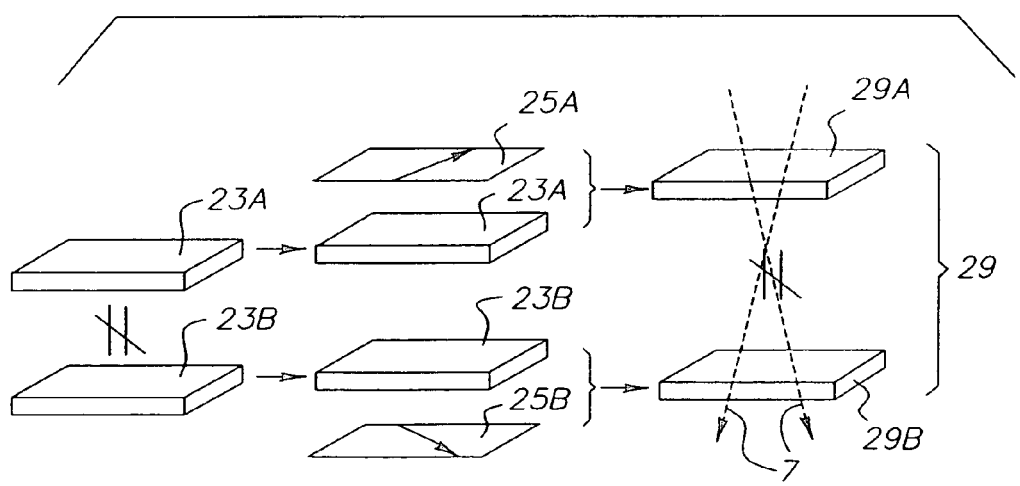
FIG. 2D is a schematic to show the configuration of one of the prior art polarizer packages.

FIG. 2A shows an improved transmissive optical device 18 formed by crossed absorbing layers 21, 22 with prior art compensators consisting of an A-plate 24 and a C-plate 26, where the optic axis of the A-plate 24 is arranged to be parallel to the transmission axis of its adjacent absorbing layer 22. FIG. 2B shows another improved transmissive optical device 19 formed by crossed absorbing layers 21, 22 with prior art compensators consisting of two different biaxial plates 27, 28. In both cases the protective layers are not shown because ideally they are preferred to have negligible retardation or they can be incorporated into respective A-plates, C-plates, or biaxial plates if they do have non-negligible retardation. However, both of the prior art optical device designs according to FIGS. 2A and 2B fail to be divided into two identical polarizer packages. Consider the optical device design according to FIG. 2A as an example. The optical device 18 can be separated into two polarizer packages with one consisting of the absorbing layer 22 and the A-plate 24 and the other one consisting of the absorbing layer 21 and the C-plate 26, however, these two polarizer packages are not identical. The optical device 18 can also be separated into two polarizer packages with one polarizer package consisting of the absorbing layer 22 and the other one consisting of the absorbing layer 21, the C-plate 26 and the A-plate 24. Again, these two polarizer packages are different. As a result, to form a transmissive optical device such as 18 and 19, two different polarizer packages (the front polarizer package and the rear polarizer package) are needed to be manufactured to provide a wide viewing performance. Consequently, the manufacturing process becomes more complex. Additionally, these polarizer packages are sensitive to the alignment of the A-plate or the biaxial plate relative to its preferred orientation as shown in FIG. 2C. This figure shows that the percentage of transmission at the 45 degree azimuth and 60 degree polar position changes with the deviation angle, which is the angle between the optic axis of the A-plate and the transmission axis of its adjacent absorbing layer. It can be seen that a misalignment of two degrees between the optic axis of the compensator and the transmission axis of the polarizer results in leakage five times larger than the perfect aligned case (0.02% to 0.1%).

Figure 4A:
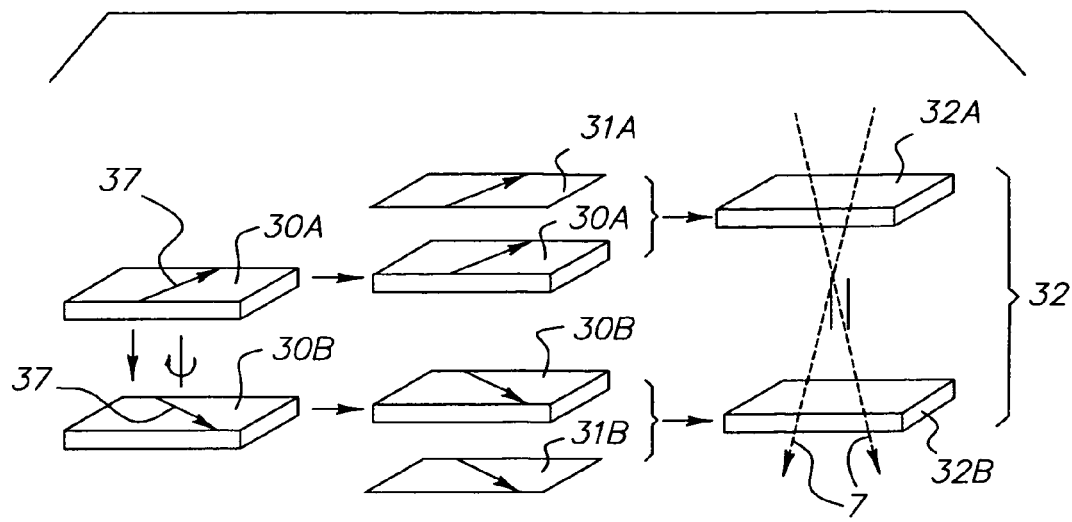
FIGS. 4A and 4B are schematics showing the configuration of a transmissive optical device formed by two crossed polarizer packages.
Figure 4B:
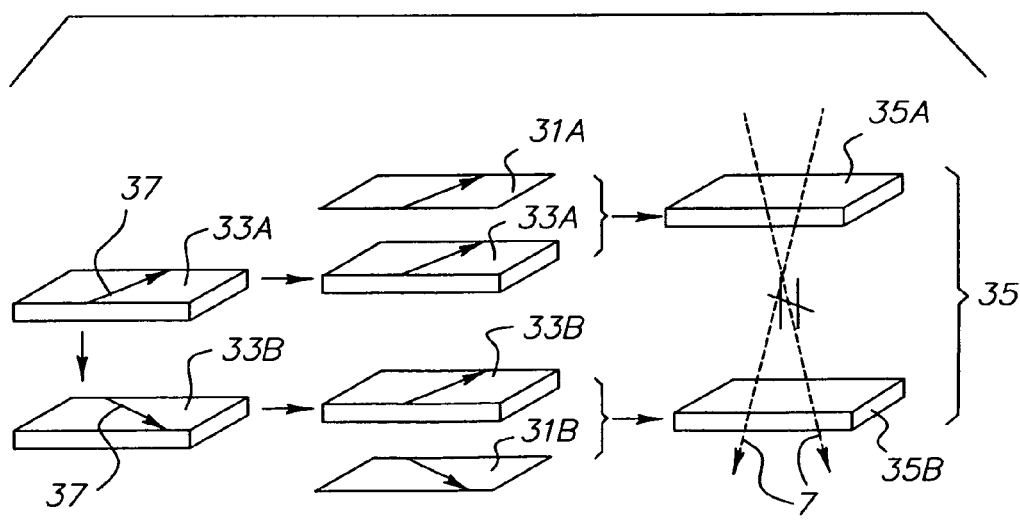

Two schemes of polarizer packages are shown in FIGS. 4A and 4B. They are inventive and comparative, respectively. In FIG. 4A, the transmissive optical device 32 comprises a pair of substantially identical crossed sheet polarizer packages 32A and 32B. The polarizer packages 32A and 32B are considered as substantially identical when they are fabricated using the same process. Each of the two polarizer packages, take 32A as an example, comprises an integrated combination of an absorbing layer 31A and a compensator 30A. The absorbing layer 31A is typically stretched PVA layer doped with dichroic crystals and causes light to be polarized. Similarly, the other polarizer package 32B comprises an integrated combination of an absorbing layer 31B and compensator 30B. The polarizer packages 32A and 32B are referred as crossed because the transmission axes of their absorbing layers 31A and 31B are crossed (or orthogonal) to each other when they are viewed from the normal direction of the layers. They should be considered as crossed when the angle formed by the two transmission axes is between 80 and 100 degrees. The compensators 30A and 30B are placed at least one side of their respectively adjacent absorbing layer 31A and 31B. In the case that they are only put on one side of their adjacent absorbing layers, they must be located between the two absorbing layers 31A and 31B. The compensator 30B is the same as the compensator 30A and is rotated 90 degrees about the normal direction of its plane relative to the compensator 30A. The arrow 37 in the plane of the compensator 30A or 30B indicates the characteristic direction of the respective compensator, which is the optic axis if the compensator is an A-plate or C-plate, or one of the two principal axes of refraction index ($n_{x0}$ or $n_{y0}$) lying in the layer plane if it is a Biaxial plate. This rule applies to all other compensators such as 30A, 30B, 33A, 33B, 52, 52A, 52B, 72, 74, 76, 76A, 76B, 78, 78A, 78B, 80, 82, and 84 those shown in the various figures.

In FIG. 4B, the transmissive optical device 35 comprises a pair of crossed sheet polarizer packages 35A and 35B. The polarizer package 35A comprises an integrated combination of an absorbing layer 31A and a compensator 33A. Similarly, the polarizer package 35B comprises an integrated combination of an absorbing layer 31B and a compensator 33B. Like in FIG. 4A, the transmission axes of the two absorbing layers 31A and 31B are crossed to each other when they are viewed from the normal direction of the layers. However, the characteristic directions of the compensators 33A and 33B are parallel to each other as opposed to that the characteristic directions of the compensators 30A and 30B are perpendicular to each other. As a result, the polarizer packages 35A and 35B are not identical. We refer to the former optical device 32 as a substantially identical inventive package design and the latter optical device 35 as a non-identical comparative compensator design.

Figure 5A:
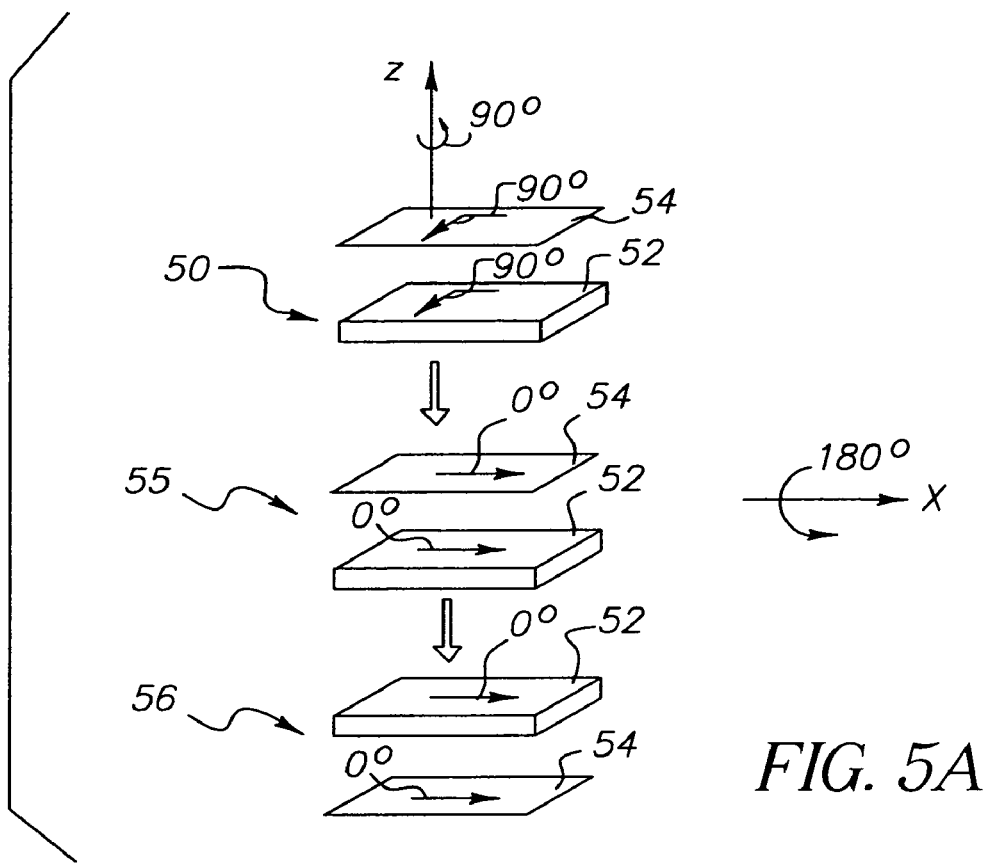
FIGS. 5A, 5B, 5C, and 5D are perspective views of a transmissive optical device formed by two crossed polarizer packages in accordance with the present invention.
Figure 5B:
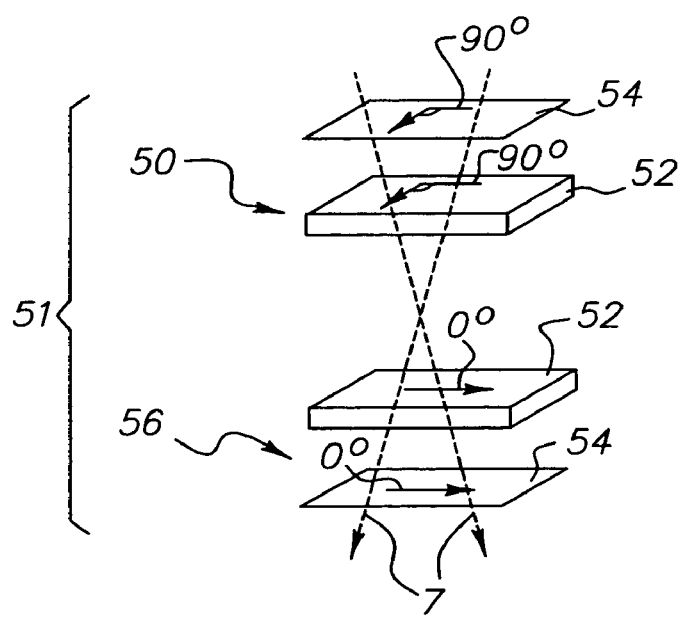
Figure 5C:
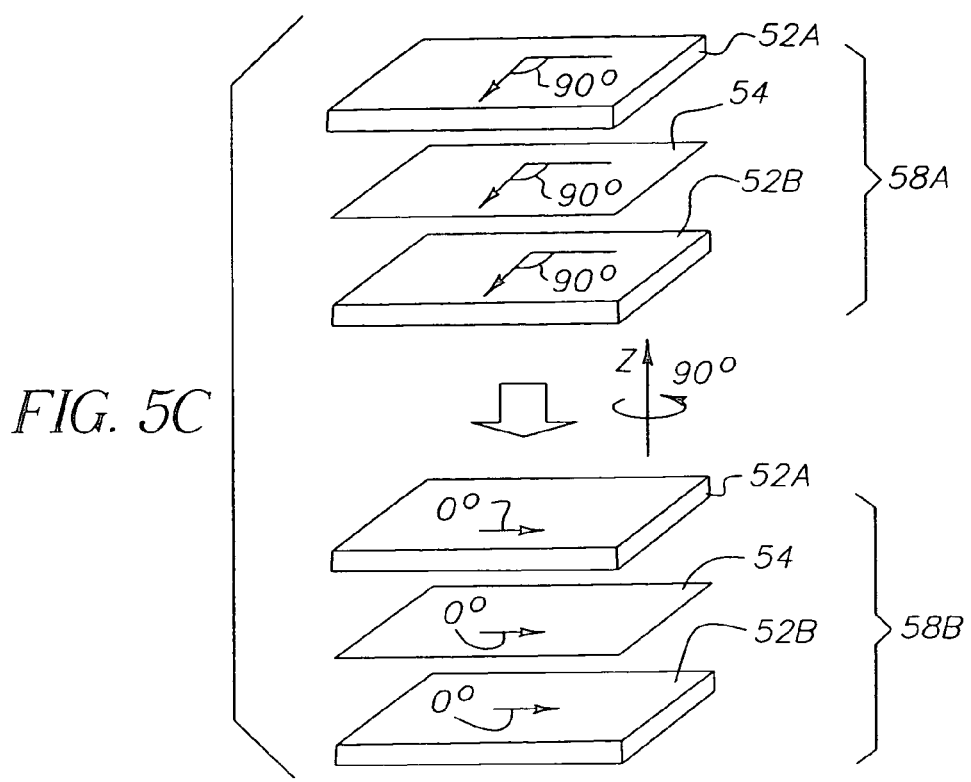
Figure 5D:
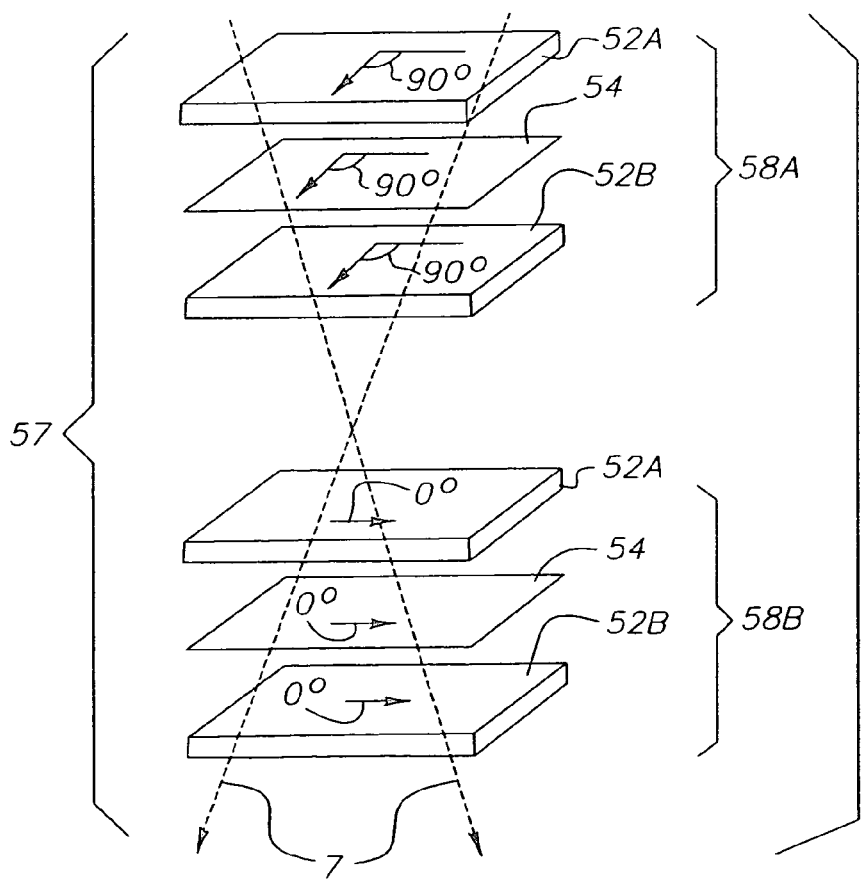
Figure 5E:
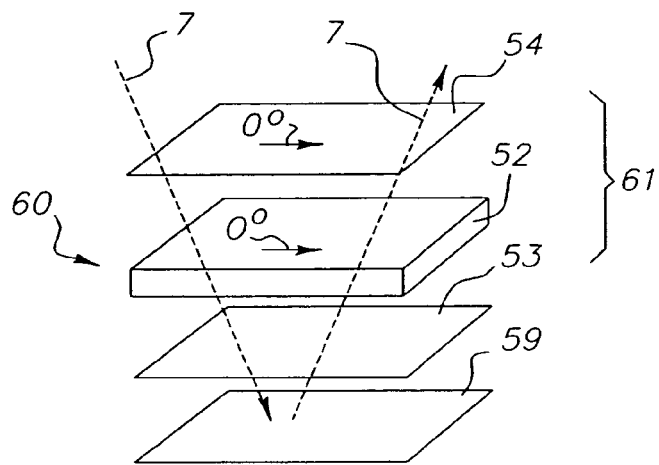
FIG. 5E is a perspective view of a reflective optical device comprising a polarizer packages in accordance with the present invention.

FIG. 5A shows a characteristic of the first example of the polarizer package 50 with absorbing layer 54 and its compensators 52 according to the identical package design. The polarizer package 56 is identical to the polarizer packages 50, 55. When the polarizer package 50 is rotated by 90 degrees about its z-axis, it is referred as the polarizer package 55. When the polarizer package 55 is flipped 180 degrees about the x-axis, it becomes the polarizer package 56. Any of the polarizer packages of identical designs can be paired like 50, 56 as shown in FIG. 5B to form a transmissive optical device 51 of the present invention with significantly reduced leakage light 7. In the second example, FIG. 5C of identical package design according to this invention, there are disposed identical compensators 52A, 52B on both sides of the absorbing layer 54 for the polarizer package 58A. The polarizer package 58B is identical to the polarizer package 58A and is obtained by a 90 degree rotation of the polarizer package 58A about the z-axis. FIG. 5D shows a transmissive optical device 57 according to the present invention formed by two identical polarizer packages 58A and 58B with their transmission axes in their absorbing layer 54 crossed to each other. Any of these polarizer packages with identical designs can also be used in combination with a quarter wave plate, such as the wide viewing angle wave plate described by Ishinabe et al. ("Design of a quarter wave plate with wide viewing angle and wide wavelength range for high quality reflective LCDs", SID 2001 Digest, pp. 906–909 (2001)). Likewise these polarizer packages can be used with a reflective layer 59 to form a reflective optical device as shown in FIG. 5E. The optical device 60 is a high performance polarizer package used in a reflective mode, comprising a polarizer package 61 containing an integrated combination of an absorbing layer 54 and a compensator 52, a quarter-wave plate 53, and a reflective layer 59. This polarizer package can be attached to a liquid crystal display, and can also be used in combination with emissive displays such as OLEDs as an ambient light rejection layer. A detailed discussion will be made referring to FIG. 10.

In the following, detailed designs of exemplary compensators of this invention are given referring to Table 1 through Table 8. In each of these tables, the orientation of a compensator such as an A-plate is provided by one angle φ in terms of its optic axis designated by the respective arrow referenced to the transmission axis of the attached absorbing layer. Due to the rotational symmetry of the optic axis of a C-plate about the z-axis, its orientation can be arbitrary. The orientation of the biaxial plate is referenced to the angle between its $n_{x0}$ axis and the transmission axis of the absorbing layer. Also shown in these tables are desired retardation values and tolerances of each compensator at a wavelength of 550 nm, unless specified otherwise.

The examples from Tables 1 through 3 show the compensator designs used in the polarizer package designs 62 (see FIG. 6A), 63 (see FIG. 6B), and 64 (see FIG. 6C), respectively, any of which can be paired like 32A and 32B to form a transmissive optical device 32 according to the identical package design shown in FIG. 4A.

EXAMPLE 1

Figure 6A:
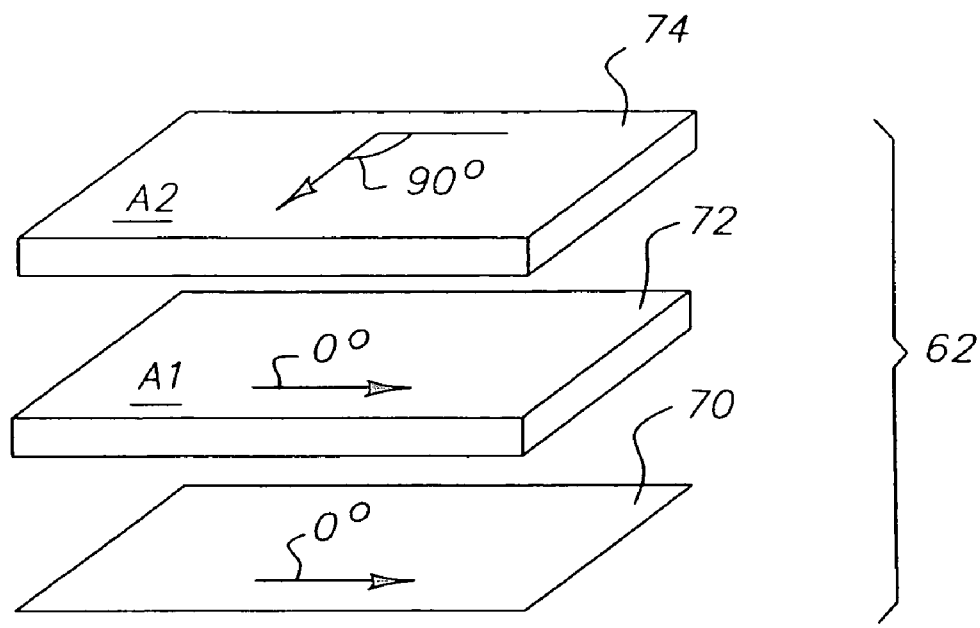
FIGS. 6A, 6B, 6C, 6D, and 6B are various embodiments of polarizer packages with compensators according to the present invention.

The polarizer package 62 is made up of an absorbing layer 70 and the compensators containing two A-plates 72, 74 according to FIG. 6A.

Table 1 shows that the A-plate 72 adjacent to the absorbing layer 70 labeled as A1 has its optic axis arranged parallel ($\phi=0°$) to the transmission axis of the absorbing layer 70. The next A-plate labeled as A2 74 has its optic axis perpendicular ($\phi=90°$) to the transmission axis of the absorbing layer 70. According to Design 1, A1 and A2 have preferred retardation of −44 nm with ±11 nm tolerance and 115 nm with ±21 nm tolerance, respectively. According to Design 2, A1 and A2 have preferred retardation of 44 nm with ±11 nm tolerance and −115 nm with ±21 nm tolerance, respectively. Any of the identical package designs falling within the retardation tolerance meets the set criterion (reducing the light leakage below 0.1% or by a factor of more than 10 compared to un-compensated crossed polarizers for all azimuthal angles when viewed from a polar angle of 60 degrees or lower).

TABLE 1

| Compensator layers | Orientation | Design 1 | Design 2 |
|---|---|---|---|
| A1 (nm) | 0° | −44 ± 11 | 44 ± 11 |
| A2 (nm) | 90° | 115 ± 21 | −115 ± 21 |

EXAMPLE 2

Figure 6B:
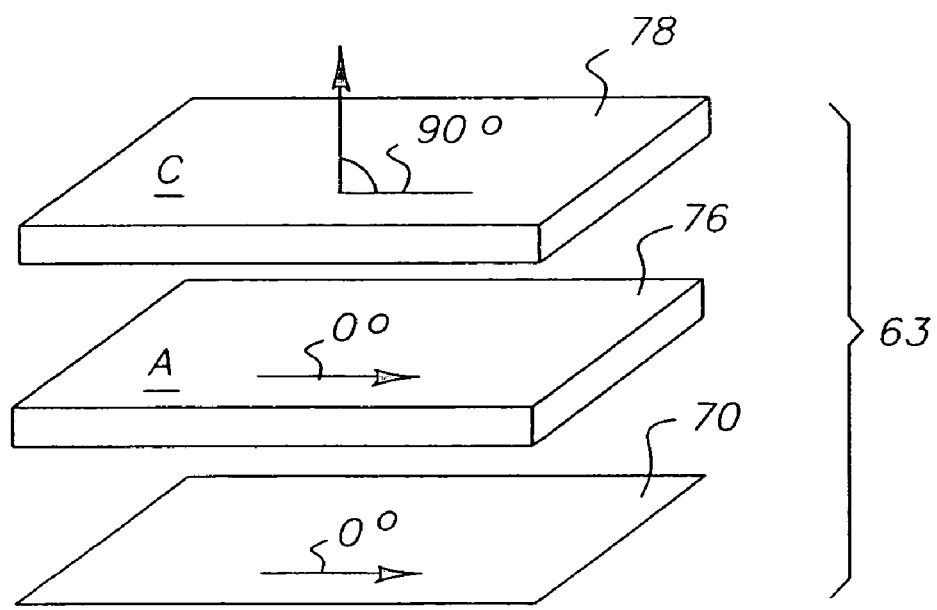

The polarizer package 63 is made up of an absorbing layer 70 and the compensators containing an A-plate 76 and a C-plate 78 as shown in FIG. 6B.

Table 2 shows another identical package designs that meet the set criterion. The A-plate 76 labeled as A in Table 2 is placed adjacent to the absorbing layer 70 and has its optic axis arranged parallel ($\phi=0°$) to the transmission axis of the absorbing layer 70. An additional C-plate 78 is positioned on the other side of the A-plate. As is mentioned earlier, the orientation of the optic axis of the C-plate can be arbitrary because of its rotational symmetry about the z-axis. According to Design 3, the A-plate and the C-plate possess retardation of −91 nm with ±12 nm tolerance and −76 nm with ±12 nm tolerance, respectively. In exemplary Design 4, the A-plate and the C-plate possess retardation of 91 nm with ±12 nm tolerance and 76 nm with ±12 nm tolerance, respectively.

TABLE 2

| Compensator layers | Orientation | Design 3 | Design 4 |
|---|---|---|---|
| A (nm) | 0° | −91 ± 12 | 91 ± 12 |
| C (nm) | Arbitrary | −76 ± 12 | 76 ± 12 |

EXAMPLE 3

Figure 6C:
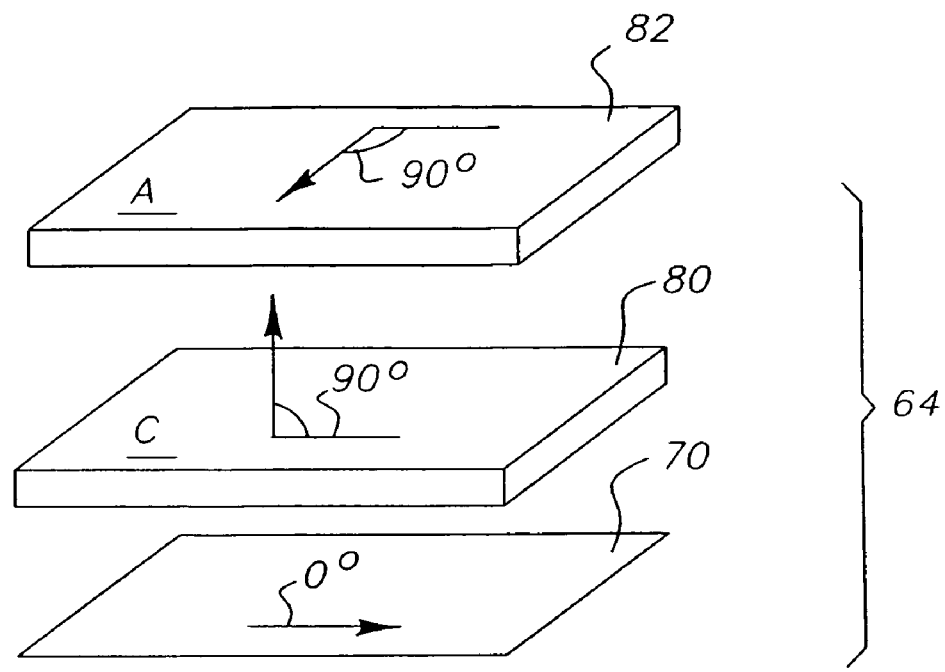

The polarizer package 64 is made up of an absorbing layer 70 and the compensators containing a C-plate 80 and an A-plate 82, see FIG. 6C.

Table 3 shows exemplary designs in which the C-plate 80 is positioned adjacent to the absorbing layer 70, and the A-plate 82 is next to the C-plate 80. Unlike in Example 2, the A-plate 82 now has its optic axis perpendicular (instead of parallel) to the transmission axis of the absorbing layer 70. The angle $\phi$ between the optic axis of the A-plate 82 and the transmission axis of the absorbing layer 70 is equal to 90°. The retardation of the C-plate 80 and the A-plate 82 is −45 nm with ±11 nm tolerance and −137 nm with ±21 nm tolerance (Design 5), respectively, or 45 nm with ±11 nm tolerance and 137 nm with ±21 nm tolerance (Design 6), respectively.

TABLE 3

| Compensator layers | Orientation | Design 5 | Design 6 |
|---|---|---|---|
| C (nm) | Arbitrary | −45 ± 11 | 45 ± 11 |
| A (nm) | 90° | −137 ± 21 | 137 ± 21 |

EXAMPLE 4

Figure 6D:
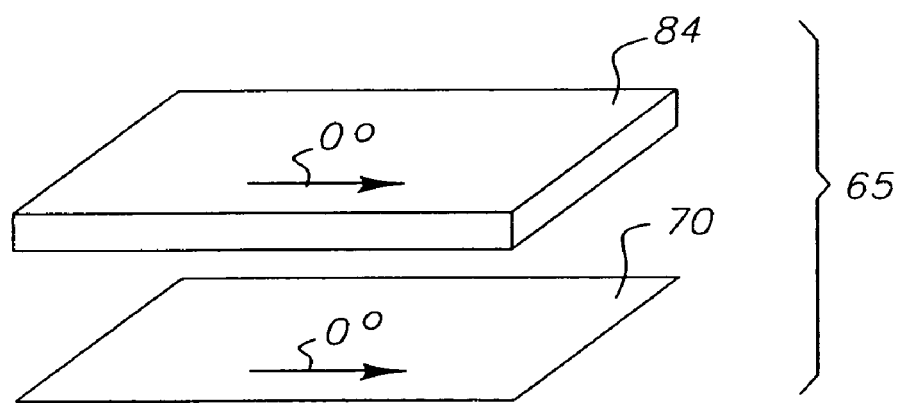

The polarizer package 65 is made up of an absorbing layer 70 and a single biaxial plate 84 referring to FIG. 6D.

Example 4 shows another polarizer package design 65, which can also be paired like 32A and 32B to form a transmissive optical device 32 according to the identical package design shown in FIG. 4A. In this example, the compensator used in a given identical polarizer package is a single biaxial plate 84, which has enhanced performance due to the use of a dispersion matched design. Table 4.1 summarizes four exemplary designs for a wavelength of 550 nm in which a single biaxial plate 84 is positioned adjacent to the absorbing layer 70. In this case, the orientation of the biaxial plate is referenced to the angle between its $n_{x0}$ axis and the transmission axis of the absorbing layer 70. The first two biaxial plates labeled as Biaxial 1 and Biaxial 2 have their $n_{x0}$ ($n_{y0} > n_{z0} > n_{x0}$, for example, $n_{y0}=1.507$, $n_{z0}=1.502$, $n_{x0}=1.5$) parallel ($\phi=0°$) to the transmission axis of the absorbing layer 70, with $(n_{y0}-n_{x0})d=271\pm40$ nm (271 nm is the preferred retardation value and ±40 nm is the tolerance around the preferred value) and $(n_{z0}-n_{x0})d=68\pm19$ nm, and $(n_{y0}-n_{x0})d=-276\pm40$ nm and $(n_{z0}-n_{x0})d=-70\pm19$ nm, respectively. The next two biaxial plates, labeled as Biaxial 3 and Biaxial 4, have their $n_{x0}$ ($n_{x0} > n_{z0} > n_{y0}$) perpendicular ($\phi=90°$) to the transmission axis of the absorbing layer 70, with $(n_{y0}-n_{x0})d=276\pm40$ nm and $(n_{z0}-n_{x0})d=208\pm35$ nm, and $(n_{y0}-n_{x0})d=-271\pm40$ nm and $(n_{z0}-n_{x0})d=-203\pm35$ nm, respectively. Table 4.1 also shows the ratios $(n_{y0}-n_{x0})d/\lambda$ and $(n_{z0}-n_{x0})d/\lambda$ for all of the four designs (Biaxial 1, Biaxial 2, Biaxial 3, and Biaxial 4), where $\lambda$ is the wavelength, which is 550 nm in this case.

Notably, the retardation values $(n_{y0}-n_{x0})d$ and $(n_{z0}-n_{x0})d$ from Table 4.1 are quite different from the ones specified in Japanese Patent 09325216A, which specifies in-plane retardation value $(n_{y0}-n_{x0})d$ as 0 to 200 nm. This is natural consequence of different design intent of this invention for reducing light leakage through two crossed identical polarizer packages below 0.1% when the viewing angle is up to 60 degrees as mentioned previously. Similarly, Ishinabe et al. ("Novel wide viewing angle polarizer with high achromaticity", SID 2000 Digest, pp. 1094–1097 (2000); and "A wide viewing angle polarizer and a quarter-wave plate with a wide wavelength range for extremely high quality LCDs", Asia Display/IDW 2001, pp. 485–488 (2001)) disclosed a non-identical package case, which needed a combination of two different biaxial plates: plate 1 with $(n_{y0}-n_{x0})d=275$ nm and $(n_{z0}-n_{x0})d=57$ nm and plate 2 with $(n_{y0}-n_{x0})d=275$ nm and $(n_{z0}-n_{x0})d=205$ nm, to achieve high performance. As discussed earlier, it is less cost efficient to make two different biaxial plates. Although it was mentioned in the above referenced publications that the two identical biaxial plates 1 and 2 can be independently paired (e.g., plate 1 and plate 1 or plate 2 and plate 2) to form an identical polarizer package, the performance in that case was significantly degraded at wavelengths other than the designed wavelength (also based on the same referenced publications). By comparison, the compensated polarizer packages according to the present invention not only can provide polarizer package constructed with identical compensators, but also can maintain a high performance for virtually all wavelengths of interest. In particular, low transmission can be provided across a wavelength range of at least 20 nm width, as well as across much bigger wavelength bands, including the entire visible 400–700 nm band. This will be better understood referring to Tables 4.2 and 4.3.

−0.124±0.040. The conclusion that both $(n_{y0}-n_{x0})d/\lambda$ and $(n_{z0}-n_{x0})d/\lambda$ are effectively constant (±20%) across all wavelengths of interest holds true not only for Biaxial 1 and Biaxial 2, but also for Biaxial 3 and Biaxial 4. When either Biaxial 3 or Biaxial 4 is used to construct the compensator, as shown in Table 4.1, the axis of $n_{x0}$ ($n_{x0}>n_{z0}>n_{y0}$) is perpendicular ($\phi=90°$) to the transmission axis of the absorbing layer 70, with $(n_{y0}-n_{x0})d=276\pm40$ nm and $(n_{z0}-n_{x0})d=208\pm35$ nm, and $(n_{y0}-n_{x0})d=-271\pm40$ nm and $(n_{z0}-n_{x0})d=-203\pm35$ nm, respectively, for the wavelength of 550 nm.

TABLE 4.1

$\lambda = 550$ nm

| Compensator | Orientation | $(n_{y0}-n_{x0})d$(nm) | $(n_{z0}-n_{x0})d$(nm) | $(n_{y0}-n_{x0})d/\lambda$ | $(n_{z0}-n_{x0})d/\lambda$ |
|---|---|---|---|---|---|
| Biaxial 1 | 0° | 271 ± 40 | 68 ± 19 | 0.493 ± 0.073 | 0.124 ± 0.035 |
| Biaxial 2 | 0° | −276 ± 40 | −70 ± 19 | −0.502 ± 0.073 | −0.127 ± 0.035 |
| Biaxial 3 | 90° | 276 ± 40 | 208 ± 35 | 0.502 ± 0.073 | 0.378 ± 0.064 |
| Biaxial 4 | 90° | −271 ± 40 | −203 ± 35 | −0.493 ± 0.073 | −0.369 ± 0.064 |

TABLE 4.2

$\lambda = 450$ nm

| Compensator | Orientation | $(n_{y0}-n_{x0})d$(nm) | $(n_{z0}-n_{x0})d$(nm) | $(n_{y0}-n_{x0})d/\lambda$ | $(n_{z0}-n_{x0})d/\lambda$ |
|---|---|---|---|---|---|
| Biaxial 1 | 0° | 222 ± 37 | 56 ± 17 | 0.493 ± 0.082 | 0.124 ± 0.038 |
| Biaxial 2 | 0° | −226 ± 37 | −57 ± 17 | −0.502 ± 0.082 | −0.127 ± 0.038 |

TABLE 4.3

$\lambda = 650$ nm

| Compensator | Orientation | $(n_{y0}-n_{x0})d$(nm) | $(n_{z0}-n_{x0})d$(nm) | $(n_{y0}-n_{x0})d/\lambda$ | $(n_{z0}-n_{x0})d/\lambda$ |
|---|---|---|---|---|---|
| Biaxial 1 | 0° | 322 ± 48 | 81 ± 22 | 0.495 ± 0.074 | 0.125 ± 0.034 |
| Biaxial 2 | 0° | −326 ± 48 | −82 ± 22 | −0.502 ± 0.074 | −0.126 ± 0.034 |

Table 4.2 and Table 4.3 are similar to Table 4.1, except that all of retardation retardation values (($n_{y0}-n_{x0})d$ and $(n_{z0}-n_{x0})d$) and the ratios of retardation values over wavelengths $\lambda$ (($n_{y0}-n_{x0})d/\lambda$ and $(n_{z0}-n_{x0})d/\lambda$) are provided for exemplary Biaxial plate 1 and Biaxial plate 2 at wavelengths 450 nm and 650 nm, respectively. Note that the values of $(n_{y0}-n_{x0})d/\lambda$ for Biaxial 1 are 0.493±0.082 at the wavelength 450 nm (Table 4.2), 0.493±0.073 at the wavelength 550 nm (Table 4.1), and 0.495±0.074 at the wavelength 650 nm (Table 4.3). Therefore, $(n_{y0}-n_{x0})d/\lambda$ is effectively a constant independent of wavelength. As will be explained later, this constancy of ratio of retardation to wavelength is obtained by choosing appropriate compensator materials to provide wavelength dispersion matching. Similarly, the values of $(n_{z0}-n_{x0})d/\lambda$ for Biaxial 1 are 0.124±0.038 at the wavelength 450 nm (Table 4.2), 0.124±0.035 at the wavelength 550 nm (Table 4.1), and 0.125±0.034 at the wavelength 650 nm (Table 4.3). Thus, both $(n_{y0}-n_{x0})d/\lambda$ and $(n_{z0}-n_{x0})d/\lambda$ are effectively constant (±20%) across all wavelengths of interest in the following range; $(n_{y0}-n_{x0})d/\lambda$ falls within 0.5±0.1 or −0.5±0.1 and $(n_{z0}-n_{x0})d/\lambda$ within 0.1±0.07 or −0.1±0.07. More preferably, $(n_{y0}-n_{x0})d/\lambda$ falls within 0.494±0.090 or −0.498±0.080 and $(n_{z0}-n_{x0})d/\lambda$ within 0.124±0.040 or For Biaxial 3, $(n_{y0}-n_{x0})d/\lambda$ falls within 0.5±0.1 and $(n_{z0}-n_{x0})d/\lambda$ within 0.38±0.08, and more preferably, $(n_{y0}-n_{x0})d/\lambda$ falls within 0.50±0.05 and $(n_{z0}-n_{x0})d/\lambda$ within 0.37±0.04. For Biaxial 4, $(n_{y0}-n_{x0})d/\lambda$ falls within −0.5±0.1 and $(n_{z0}-n_{x0})d/\lambda$ within −0.38±0.08, and more preferably, $(n_{y0}-n_{x0})d/\lambda$ falls within −0.5±0.05 and $(n_{z0}-n_{x0})d/\lambda$ within −0.37±0.04. The modeling indicates that the exemplary designs can be achieved with wide variations of both $(n_{z0}-n_{x0})d/\lambda$ and $(n_{y0}-n_{x0})d/\lambda$ of approximately ±20%, but smaller variations mean that lower transmission values are achieved, which are closer to target.

Figure 7A:
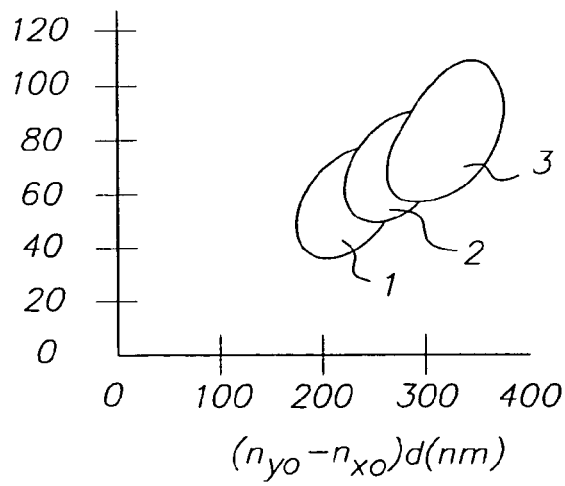
FIGS. 7A, 7B, and 7C provide the retardation values of biaxial plates according to the present invention.
Figure 7B:
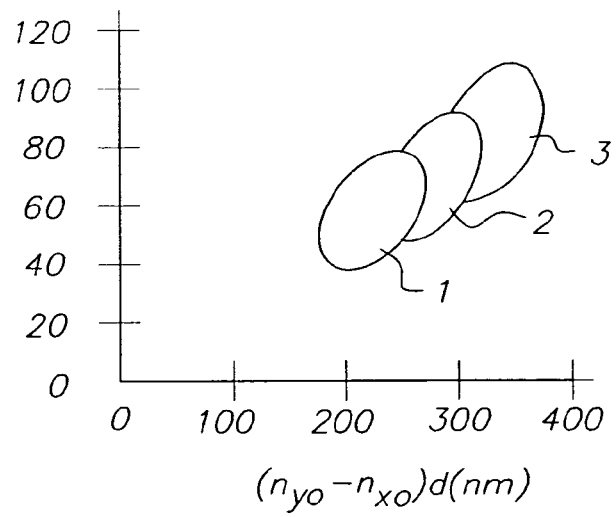
Figure 7C:
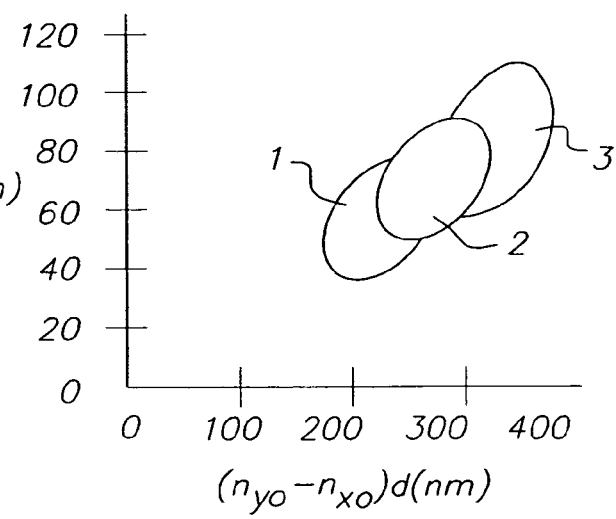

FIGS. 7A, 7B, and 7C plot the retardation values of $(n_{y0}-n_{x0})d$ and $(n_{z0}-n_{x0})d$ with which the transmission of the optical device 32 formed by two crossed polarizer packages 65 according to the design of Biaxial 1 is less than 0.1% at 450 nm (Area 1), 550 nm (Area 2), and 650 nm (Area 3). Because of overlapping among Area 1, Area 2, and Area 3, the same data are plotted in three figures in different ways so that they can be well understood. In FIG. 7A, Area 3 (650 nm) is on top of Area 2 (550 nm), which is on top of Area 1 (450 nm). It is the other way around in FIG. 7B, in which Area 1 is on top of Area 2 and Area 3. In FIG. 7C, Area 2 is on top of Area 1 and Area 3. The area given by $(n_{y0}-n_{x0})d=265\pm5$ nm and $(n_{z0}-n_{x0})d=65\pm10$ nm is most overlapped for the three primary wavelengths. Notably, these areas of acceptable retardation values are not rectangular. Furthermore, this example shows a single biaxial plate with retardations of $(n_{yo}-n_{xo})d=265$ nm and $(n_{zo}-n_{xo})d=65$ nm would give less than 0.1% transmission in the green (550 nm) and slightly over the target 0.1% transmission in both the blue (450 nm) and red (650 nm). This means that it is possible to design a compensator for low transmission with a constant retardation vs wavelength. However, the tolerance of acceptable retardation is very small and the wavelength range over which the target low transmission is provided is significantly limited.

Figure 8A:
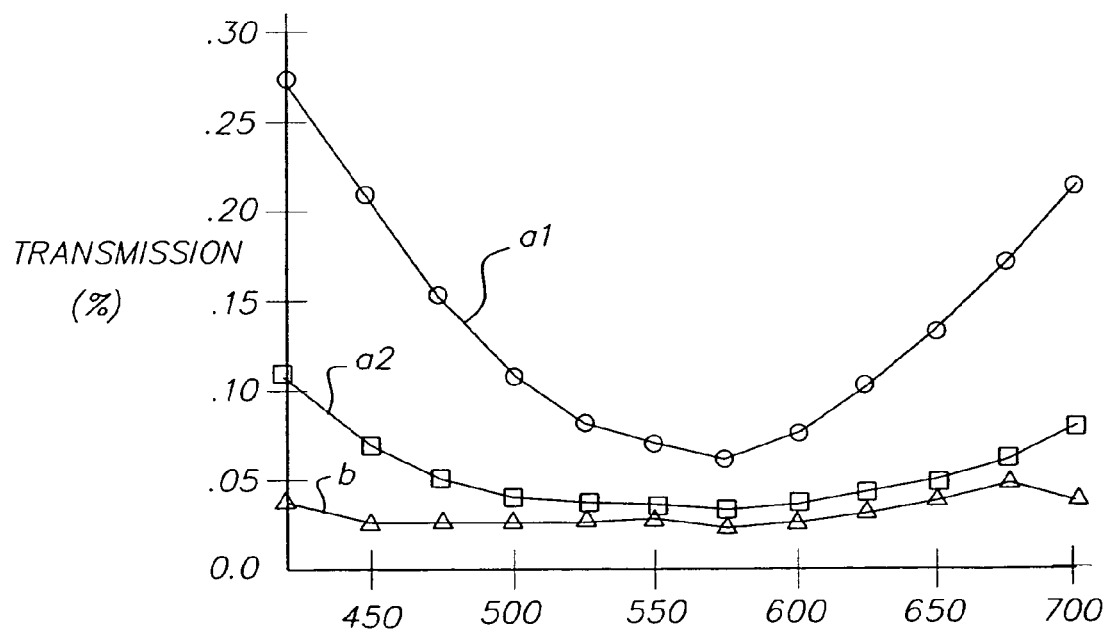
FIG. 8A shows the wavelength dependence of transmission for an optical device formed by a pair of crossed polarizer packages.

For all examples except for Biaxial plate 1 and Biaxial 2 in Example 4, although retardation values are given only at the wavelength of 550 nm, it should be understood that a polarizer package can be used for a wide range of wavelengths by properly choosing wavelength dispersion of compensators. The wavelength dispersion matching means that the values of $(n_{yo}-n_{xo})d/\lambda$ and $(n_{zo}-n_{xo})d/\lambda$ for a biaxial plate and the ratio of retardation to a wavelength for an A-plate or a C-plate are effectively constant across all wavelengths of interest as discussed above referring to Tables 4.1, 4.2, and 4.3. Or in another words, the wavelength dispersion matching is taken to mean that the birefringence $(n_{yo}-n_{xo})$ or $(n_{zo}-n_{xo})$ for the chosen materials has a constant slope vs wavelength. Modeling indicates that with practical materials these conditions are met with values of the ratio of retardation vs wavelength $(n_{yo}-n_{xo})d/\lambda$ that generally converge in limited solution spaces, such as 0.5±0.1 for biaxial plates. FIG. 8A shows a wavelength dependence of transmission through three different crossed polarizer packages when viewed from a direction of 45 degree azimuth and 60 degree polar angle. Prior Art 1 (shown by curve a1 with open circles) is an identical polarizer package with a biaxial plate compensator and Prior Art 2 (shown by curve a2 with open squares) corresponds to a non-identical polarizer package with two different biaxial plates. Both of the prior arts are according to the configurations given by Ishinabe et al. ("Novel wide viewing angle polarizer with high achromaticity", SID 2000 Digest, pp. 1094–1097 (2000)). The prior art packages suffer leakage at short and long wavelength ends. Particularly, Prior Art 1 (curve a1) transmits more than 0.25% of light at 420 nm. On the other hand, the identical package with wavelength dispersion matching according to the current invention (shown by curve b with open triangles) gives much lower transmission than both of the prior examples for all wavelengths examined. This is accomplished by choosing materials with wavelength dispersion matching such that the values of $(n_{yo}-n_{xo})d/\lambda$ and $(n_{zo}-n_{xo})d/\lambda$ are constant. Materials with $(n_{yo}-n_{xo})d/\lambda$ and $(n_{zo}-n_{xo})d/\lambda$ independent of wavelength have been used to fabricate a product line of wide-band retardation films, as discussed by Uchiyama et al. ("Recent Progress in Optical Retardation Films for FPDs", Asia Display/IDW 2001, pp. 493–496). Modeling has shown that the transmission degradation vs wavelength of the Prior Art 1 (curve a1) and Prior Art 2 (curve a2) is typical of compensator designs utilizing materials which do not have constant $(n_{yo}-n_{xo})d/\lambda$ and $(n_{zo}-n_{xo})d/\lambda$ vs wavelength. Although Prior Art 1 (curve a1) uses an identical polarizer package, this prior art crossed polarizer packages provides transmission performance which significantly degrades vs wavelength as shown in FIG. 8A. Prior Art 2 (curve a2) has reduced transmission, however, it has to use two different biaxial plates.

Figure 8B:
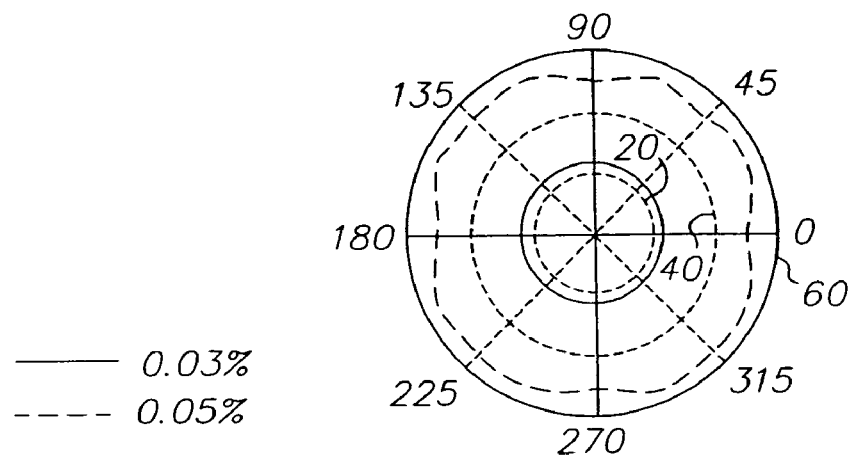
FIG. 8B is an iso-luminance plot for an optical device formed by a pair of crossed polarizer packages without dispersion matching.
Figure 8C:
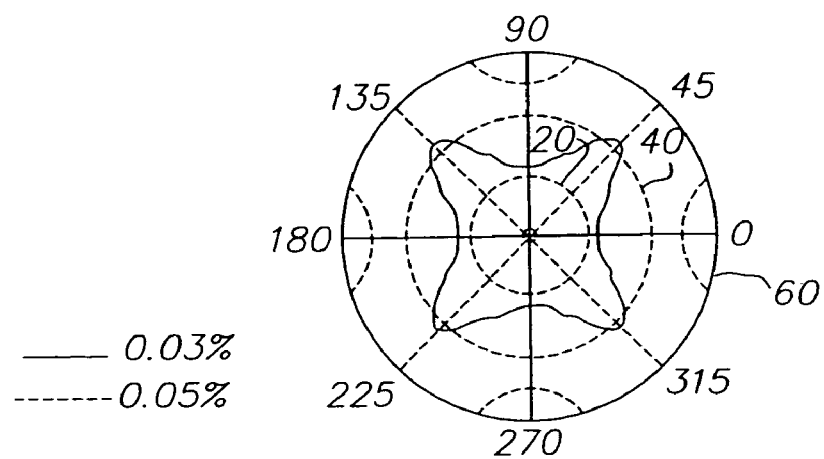
FIG. 8C is an iso-luminance plot for an optical device formed by a pair of crossed polarizer packages without dispersion matching.

FIGS. 8B and 8C compare the compensation effect of a compensator without (FIG. 8B) and with (FIG. 8C) dispersion matching for the same polarizer package in terms of iso-luminance plot when white light passes through the crossed polarizer packages. Both figures show iso-luminance curves of 0.03% and 0.05%. The iso-luminance curves in FIG. 8C are extended toward outside especially at a 45 degree azimuthal angle and enclose a larger area than their counterparts in FIG. 8B. Therefore, the one with dispersion matching (FIG. 8C) has equal or lower light leakage everywhere compared to the one without dispersion matching (FIG. 8B). An unusual characteristic is that the one with dispersion matching has lower luminance when viewed from an azimuthal angle of 45 degrees than 0 degree. In comparison, un-compensated crossed polarizer packages show much higher luminance when viewed from an azimuthal angle of 45 degrees than 0 degree. In another comparison, crossed polarizers compensated by compensators without dispersion matching show about the same luminance when viewed from a 45 degrees azimuth as at 0 degrees. In general, for a wavelength $\lambda$, the desired retardation value (in nm) is the retardation at 550 nm given in the above tables (Tables 1, 2, 3, 4.1, 4.2, and 4.3) multiplied by $\lambda/550$. It should also be understood that any designs by adding or subtracting a full-wave retardation to or from the given examples are obvious to those skilled in the art.

Figure 6E:
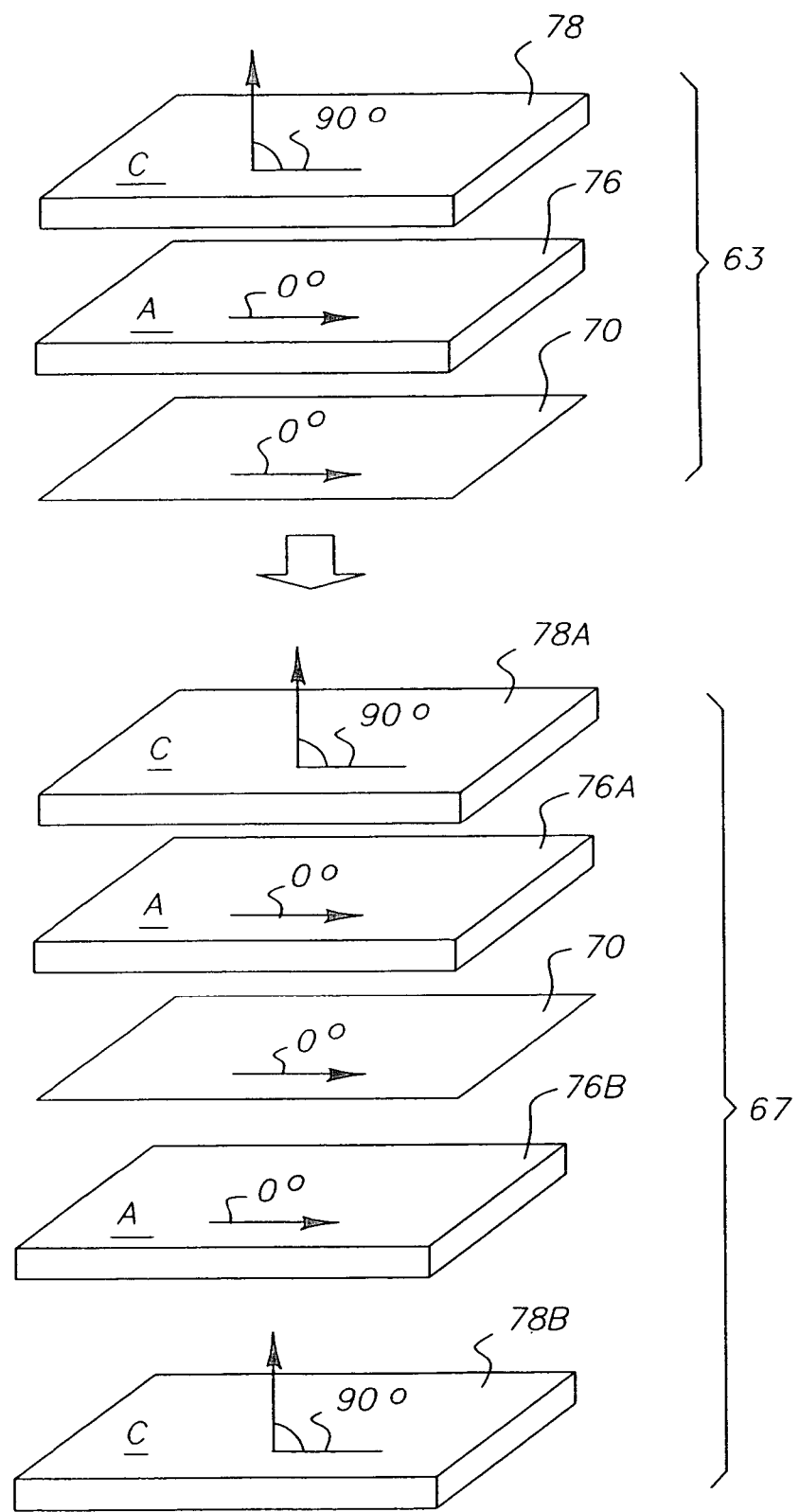

FIGS. 6A through 6D show polarizer packages with compensators on one side of absorbing layer 70. To obtain the transmissive optical device 51 (see FIG. 5B) formed by two crossed polarizer packages, one has to follow the two rotations according to FIG. 5A. In all of the polarizer packages, compensators can be put on both sides of the absorbing layer as exemplified in FIG. 6E. The compensators A-plates 76A, 76B and C-plates 78A, 78B are placed on both sides of the absorbing layer 70 in the polarizer package 67 in a symmetric fashion. The placement for crossed polarizer packages in the transmissive optical device 57 follows FIGS. 5C and 5D.

TABLE 5

| Compensator layers | Orientation | Design 7 | Design 8 | Design 9 | Design 10 |
|---|---|---|---|---|---|
| A1 (nm) | 0° (or 90°) | 92 ± 24 | 92 ± 24 | −92 ± 24 | −92 ± 24 |
| A2 (nm) | 90° (or 0°) | 224 ± 11 | −46 ± 11 | −224 ± 11 | 46 ± 11 |

TABLE 6

| Compensator layers | Orientation | Design 11 | Design 12 | Design 13 | Design 14 |
|---|---|---|---|---|---|
| A (nm) | 0° or 90° | −138 ± 21 | 138 ± 21 | −401 ± 21 | 401 ± 21 |
| C (nm) | Arbitrary | −44 ± 11 | 44 ± 11 | 44 ± 11 | −44 ± 11 |

TABLE 7

| Compensator layers | Orientation | Design 15 | Design 16 | Design 17 | Design 18 |
|---|---|---|---|---|---|
| C (nm) | Arbitrary | −260 ± 40 | −260 ± 40 | −260 ± 40 | 260 ± 40 |
| A (nm) | 0° or 90° | −128 ± 5 | 128 ± 5 | 141 ± 5 | −141 ± 5 |

TABLE 8

| Compensator | Orientation | $(n_{y0}-n_{x0})d$ (nm) | $(n_{z0}-n_{x0})d$ (nm) | $(n_{y0}-n_{x0})d/\lambda$ | $(n_{z0}-n_{x0})d/\lambda$ |
|---|---|---|---|---|---|
| Biaxial 5 | 0° or 90° | 138 ± 20 | 69 ± 18 | 0.251 ± 0.036 | 0.125 ± 0.033 |
| Biaxial 6 | 0° or 90° | −138 ± 20 | −69 ± 18 | −0.251 ± 0.036 | −0.125 ± 0.033 |
| Biaxial 7 | 0° or 90° | 412 ± 21 | 206 ± 49 | 0.749 ± 0.038 | 0.375 ± 0.089 |
| Biaxial 8 | 0° or 90° | −412 ± 21 | −206 ± 49 | −0.749 ± 0.038 | −0.375 ± 0.089 |

Tables 5 though 8 give the retardation values of additional exemplary compensators at the wavelength of 550 nm for polarizer packages, either of which can be paired like 35A and 35B to form a transmissive optical device 35 according to the symmetric-compensator design as shown in FIG. 4B. In general, all identical package designs according to Tables 1 through 4 have equivalent performance to symmetric-compensator designs according to Tables 5 through 8 when the characteristic direction of compensators is perfectly aligned with the transmission axis of the absorbing layer. However, when an angular dependence is considered, the identical package designs according to Tables 1 through 4 are preferred. All the symmetric-compensator designs (Design 7 through Design 18, and Biaxial 5 through Biaxial 8) have tight requirement for the alignment of the characteristic direction of the compensator relative to the transmission axis of the attached absorbing layer. Typically, an accuracy of two degrees is required to meet the set criterion (reducing the light leakage below 0.1% or by a factor of more than 10 compared to un-compensated crossed polarizers for all azimuthal angles when viewed from a polar angle of 60 degrees), and in some cases, one-degree tolerance must be satisfied. On the other hand, all identical package designs have much larger angular tolerance.

Figure 9A:
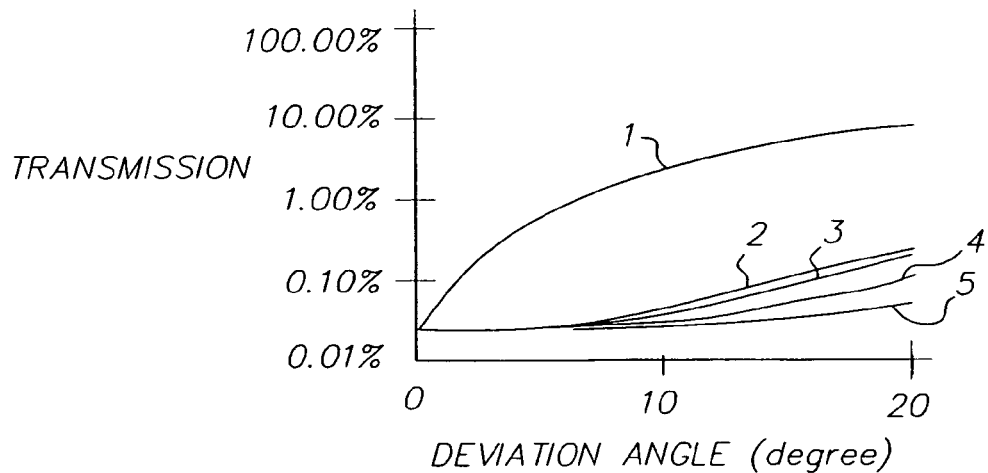
FIGS. 9A and 9B are comparisons of an angular tolerance of an optical device formed by a pair of crossed polarizer packages according to the invention and a prior art.
Figure 9B:
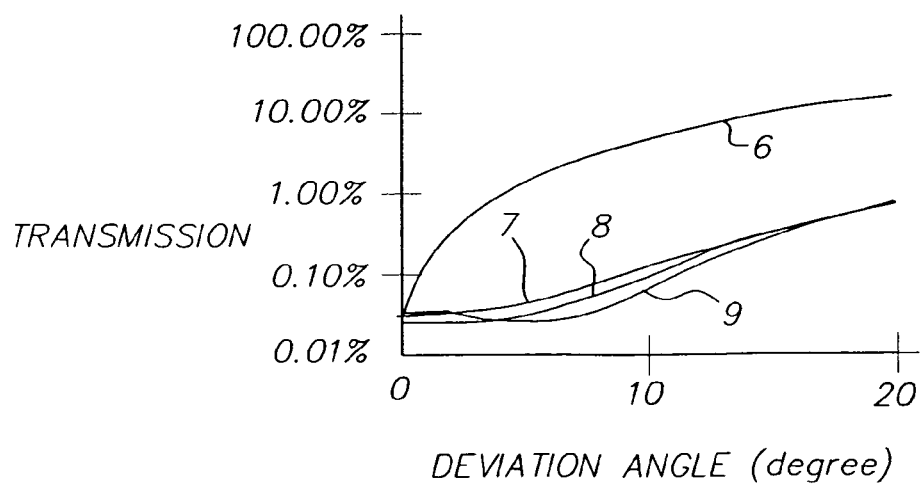

In FIGS. 9A and 9B provided are the transmission curves through a transmissive optical device formed by two crossed compensated polarizer packages in accordance with the present invention vs deviation angle of the characteristic direction of the compensator relative to its desired orientation set according to Table 1 through Table 8. In FIG. 9A, curve 1 corresponds to the prior art compensated polarizers such as the one given by Chen et al. ("Optimum film compensation modes for TN and VA LCDs", SID 98 Digest, pp. 315–318 (1998)). Curve 2 and Curve 3 correspond to Design 3 in Example 2 and Design 5 in Example 3, respectively. In Examples 2 and 3, the compensators are combination of a C-plate and an A-plate. In these cases, the deviation angle is the angle of the optic axis of the A-plate from the exact position specified in the Tables 2 and 3. Because two A-plates are used for Design 1 and Design 2 in Example 1, we consider two deviation angles. One is that of A2 plate, curve 4 and the other is A1 plate, curve 5. All the exemplary designs of the invention show transmission lower than 0.1% with a wide tolerance of deviation angle.

FIG. 9B shows the angular dependence of transmission when the compensator is a biaxial plate. In this case, the deviation angle is the angle of the $n_{x0}$ axis of the biaxial plate from the exact position specified in the Tables 4.1, 5, 6, 7, and 8. Curve 6 is atypical behavior of symmetric-compensator designs according to Tables 5, 6, 7, and 8, which shows a tight requirement of about 2 degrees for alignment of the principal axes of biaxial plates relative to their preferred orientation. When the deviation angle is 2 degrees, the light leakage jumps from 0.02% (0 degree deviation) to 0.1%. Curves 7, 8, and 9 are resulted from Biaxial 1 plates according to the identical package design (Table 4.1). Curve 8 is obtained when Biaxial 1 has the nominal values shown in Table 4.1 $(n_{y0}-n_{x0})d=271$ nm and $(n_{z0}-n_{x0})d=68$ nm, showing the minimum transmission when the alignment is perfect (the deviation angle is zero). Curve 9 and Curve 7 show other values within the acceptable tolerance of ±40 nm for $(n_{y0}-n_{x0})d$ and of ±19 nm for $(n_{z0}-n_{x0})d$. Curve 9 comes from Biaxial 1 with $(n_{y0}-n_{x0})d=285$ nm and $(n_{z0}-n_{x0})d=70$ nm; Curve 7 corresponds to Biaxial 1 plate with $(n_{y0}-n_{x0})d=265$ nm and $(n_{z0}-n_{x0})d=70$ nm, the overlapping point of Area 1, Area 2, and Area 3 for the three primary wavelengths as shown in FIG. 7.

Now consider the tolerance of biaxiality of A-plates and C-plates. Ideally, both A-plates and C-plates are uniaxial materials, namely, two of the three principal refractive indices are equal to each other (suppose $n_{x0}=n_{y0}$). However, materials with small biaxiality can be used according to the current invention, as long as the difference between $n_{x0}$ and $n_{y0}$ is smaller than 0.00005 for A-plates, and 0.0008 for C-plates.

Although all above mentioned examples are designed specifically for "O" type sheet polarizers, the inventors have also realized and confirmed that design principles and even the same compensators function for "E" type polarizers equally well. In another words, "O" type polarizers can be replaced with "E" type polarizers in all above examples. However, due to the fact that the transmission axis of an "E" type polarizer is its optic axis (or axis of the extraordinary index), while the absorption axis of an "O" type polarizer is its optic axis (or axis of the extraordinary index), the transmission axis of the "E" type polarizer should be oriented in the same way as the absorption axis of the "O" type polarizer.

The above biaxial plates can be fabricated according to U.S. Pat. No. 5,245,456 (Yoshimi et al.). As is well known in art, C-plates can be fabricated by the use of uniaxially compressed polymers or casting acetate cellulose, while A-plates can be made by stretched polymers films such as polyvinyl alcohol or polycarbonate.

Figure 10:
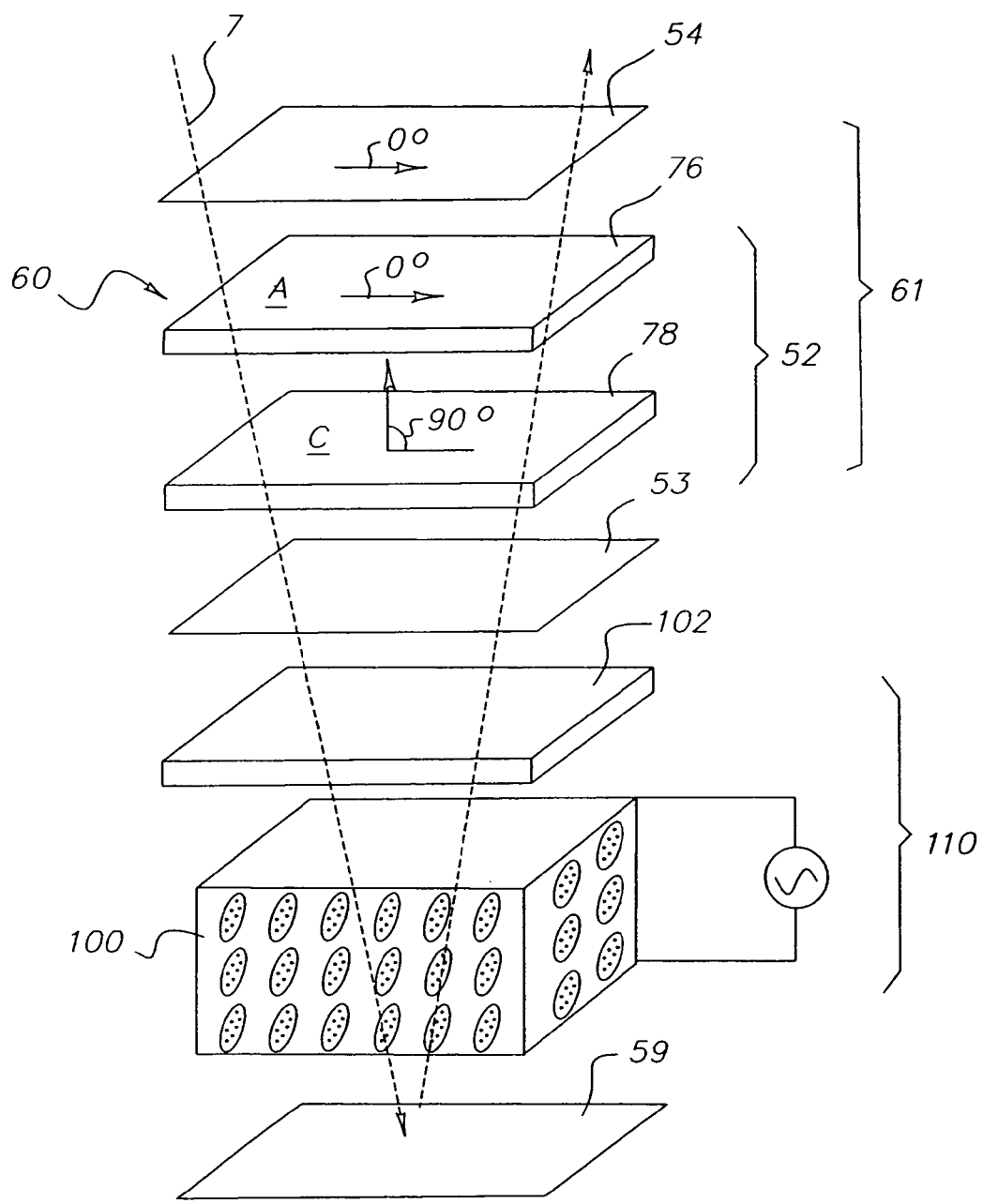
FIG. 10 is an example of an application of a polarizer package in accordance with the invention to a display.

The above transmissive optical devices 51 and 57 and reflective optical device 60 of the invention comprising a high performance polarizer package can be used with various modes of liquid crystal displays, particularly with twisted nematic (TN) liquid crystal mode, vertically aligned (VA) liquid crystal mode, optically compensated bend (OCB) mode, and in-plane switching (IPS) mode. By employing an optical device comprising polarizer packages according to the current invention, one can improve the viewing quality of these displays. When the transmissive optical device 51 or 57 comprises an LCD cell, the LCD cell is located between the two crossed polarizer packages. FIG. 10 shows an example that the high performance optical device 60 (as shown in FIG. 5E) is used in combination with a display 110. In this particular example, the display 110 is a liquid crystal display. More particularly, it is a VA reflective liquid crystal cell 100 and a cell compensator 102. The display 110 is positioned between the reflective layer 59 and the quarter wave plate 53. The polarizer package 61 comprises an integrated combination of the absorbing layer 54 and the compensator 52, which can be any embodiment of polarizer packages 62, 63, 64, 65, 67 according to FIGS. 6A through 6E, although the compensator 52 shown in this example comprises an A-plate 76 and a C-plate 78 according to FIG. 6B. In a dark state of the liquid crystal display, little light 7 can pass through the optical device 60 and the display 110 from a large viewing angle, which results in a high quality in the display.

The optical device 60 of the current invention, comprising of a polarizer package, a high performance quarter wave plate, and a reflective layer, can be used not only as a wide viewing angle polarizer for reflective liquid crystal displays, but also as an ambient light rejection layer applicable for CRTs, OLEDs and other emission mode displays. In the case of an OLED, a reflective layer is usually built into the display to boost light throughput for a bright state. However, ambient light is also strongly reflected from the reflective layer toward the user for both bright and dark states, which washes out desired image. When the display 110 is an emissive display such as an OLED, which emits light itself under a current, the ambient light 7 is blocked by the polarizer package 61 even at a large viewing angle, thus a high contrast OLED with high brightness is realized.

The invention has been described in detail with particular reference to certain preferred embodiments thereof, but it will be understood that variations and modifications can be effected within the scope of the invention.

PARTS LIST 5 xyz coordinate system
7 light
10 polarizer package
10A polarizer package
10B polarizer package
12 protective layer
12A protective layer
12B protective layer
14 absorbing layer
14A absorbing layer
14B absorbing layer
15 transmissive optical device
18 transmissive optical device
19 transmissive optical device
21 absorbing layer
22 absorbing layer
23A compensator
23B compensator
24 A-plate
25A absorbing layer
25B absorbing layer
26 C-plate
27 biaxial plate
28 biaxial plate
29 transmissive optical device
29A polarizer package
29B polarizer package
30A compensator
30B compensator
31A absorbing layer
31B absorbing layer
32 transmissive optical device
32A polarizer package
32B polarizer package
33A compensator
33B compensator
35 transmissive optical device
35A polarizer package
35B polarizer package
37 arrow indicating characteristic direction of a compensator
50 polarizer package
51 transmissive optical device
52 compensator
52A compensator
52B compensator
53 quarter wave plate
54 absorbing layer
55 polarizer package
56 polarizer package
57 transmissive optical device
58A polarizer package
58B polarizer package
59 reflective layer
60 optical device in reflective mode
61 polarizer package
62 polarizer package
63 polarizer package
64 polarizer package
65 polarizer package
66 polarizer package
67 polarizer package
70 absorbing layer
72 A-plate
74 A-plate
76 A-plate
76A A-plate
76B A-plate
78 C-plate
78A C-plate
78B C-plate
80 C-plate
82 A-plate
84 biaxial plate
100 liquid crystal cell
102 compensator for a liquid crystal cell
110 display
$n_e$ extraordinary refractive index
$n_o$ ordinary refractive index
$n_{x0}$, $n_{y0}$, $n_{z0}$ three principal indices of refraction
$\theta$ polar angle
$\phi$ azimuthal angle

What is claimed is:

1. An optical device comprising a pair of substantially identical crossed sheet polarizer packages, each package comprising an integrated combination of an absorbing layer and a compensator located on at least one side of said absorbing layer, wherein the compensator comprises a combination including:

(A) two A-plates wherein the first A-plate is placed next to the absorbing layer and the second A-plate is next to the first A-plate, wherein the optic axis of the first A-plate is parallel to the transmission axis of the absorbing layer and the optic axis of the second A-plate is perpendicular to the transmission axis of the absorbing layer wherein the first and second A-plates exhibit retardation at a wavelength of 550 nm in the range of (a) −44±11 nm and 115±21 nm, respectively, or, (b) 44±11 nm and −115±21 nm, respectively or (B) an A-plate and a C-plate wherein the A-plate is placed next to the absorbing layer and the C-plate is attached next to the A-plate, and wherein the optic axis of said A-plate is parallel to the transmission axis of the absorbing layer and wherein the A-plate and said C-plate exhibit retardation at a wavelength of 550 nm are in the range of (a) 91±12 nm and 76±12 nm, respectively, or, (b) −91±12 nm and −76±12 nm, respectively, or (C) an A-plate and a C-plate wherein the C-plate is placed next to the absorbing layer and the A-plate is adjacent to the C-plate wherein the optic axis of the A-plate is perpendicular to the transmission axis of the absorbing layer, and wherein the A-plate and the C-plate exhibit a retardation at a wavelength of 550 nm in the range of (a) 45±11 nm and 137±21 nm, respectively, or (b) −45±11 nm and −137±21 nm, respectively.

2. A device according to claim 1 wherein the ratio of the retardation to wavelength for said compensator is effectively constant (±20%) across a wavelength range of any 20 nm width.

3. A device according to claim 1 further comprising a liquid crystal display.

4. The device of claim 1 comprising two A plates.

5. The device of claim 1 comprising an A plate and a C plate wherein the A-plate is placed next to the absorbing layer and the C-plate is attached next to the A-plate.

6. The device of claim 1 comprising an A plate and a C plate wherein the C-plate is placed next to the absorbing layer and the A-plate is attached next to the C-plate.

* * * * *